(12) United States Patent
Shalgi

(10) Patent No.: US 11,484,103 B2
(45) Date of Patent: Nov. 1, 2022

(54) WHEELED LUGGAGE CASE

(71) Applicant: ORG Group, LLC, Los Angeles, CA (US)

(72) Inventor: Netta Shalgi, Tel Aviv (IL)

(73) Assignee: ORG Group, LLC, Los Angeles, CA (US)

( * ) Notice: Subject to any disclaimer, the term of this patent is extended or adjusted under 35 U.S.C. 154(b) by 0 days.

(21) Appl. No.: 16/895,369

(22) Filed: Jun. 8, 2020

(65) Prior Publication Data
US 2021/0337946 A1    Nov. 4, 2021

Related U.S. Application Data

(63) Continuation of application No. 15/031,737, filed as application No. PCT/IL2013/050878 on Oct. 28, 2013, now Pat. No. 10,674,799.

(51) Int. Cl.
*A45C 5/14* (2006.01)
*B60B 3/00* (2006.01)
(Continued)

(52) U.S. Cl.
CPC .............. *A45C 5/14* (2013.01); *A45C 5/03* (2013.01); *A45C 7/0027* (2013.01);
(Continued)

(58) Field of Classification Search
CPC .. A45C 5/14; A45C 5/145; A45C 5/03; A45C 7/0031; A45C 7/0027;
(Continued)

(56) References Cited

U.S. PATENT DOCUMENTS 667,647 A * 2/1901 Camp .................. F16C 33/526
384/552
1,066,613 A * 7/1913 Higgin ..................... B60B 7/00
301/108.1
(Continued)

FOREIGN PATENT DOCUMENTS

CN        201299208        9/2009
DE    102010025056 A1    12/2011
(Continued)

OTHER PUBLICATIONS

Extended European Search Report dated Jun. 8, 2017 for EP Application No. 13896476.2, 7 pages.
(Continued)

*Primary Examiner* — Steve Clemmons
(74) *Attorney, Agent, or Firm* — RMCK Law Group, PLC

(57) ABSTRACT

A wheeled luggage case comprises (a) a storage chamber, (b) a cover defining an opening on at least one side of the storage chamber for providing ready access therein and at least two labyrinth axle-free wheels operatively connected to the chamber for towing the case along a ground surface. The labyrinth axle-free wheel comprises an internal rim, an external rim provided with a ground interface, rollers being rotatably disposed within a roller spacer between the internal and external rims in a uniform circumferential manner by means of a spacer and external covers. A labyrinth type dust passage in the wheel is defined by the rims and the external plates mechanically connected to the internal rim.

20 Claims, 32 Drawing Sheets

(51) Int. Cl.
| | | |
|---|---|---|
| *A45C 7/00* | (2006.01) | |
| *A45C 5/03* | (2006.01) | |
| *A45C 13/26* | (2006.01) | |
| *A45C 15/00* | (2006.01) | |
| *A45C 15/06* | (2006.01) | |
| *H02J 7/00* | (2006.01) | |
| *B60B 37/10* | (2006.01) | |

(52) U.S. Cl.
CPC .......... *A45C 7/0031* (2013.01); *A45C 13/262* (2013.01); *A45C 15/00* (2013.01); *A45C 15/06* (2013.01); *B60B 3/001* (2013.01); *H02J 7/0042* (2013.01); *H02J 7/0047* (2013.01); *A45C 2013/267* (2013.01); *B60B 37/10* (2013.01); *B60B 2200/45* (2013.01); *H02J 7/0048* (2020.01)

(58) Field of Classification Search
CPC ....... A45C 13/262; A45C 15/00; A45C 15/06; B60B 2200/45; B60B 25/00; B60B 25/002; B60B 19/00; B60B 3/001; B60B 37/10; F16C 29/045; F16C 33/4652; F16C 33/526; H02J 7/0042; H02J 7/0047
See application file for complete search history.

(56) References Cited

U.S. PATENT DOCUMENTS

| | | | |
|---|---|---|---|
| 1,622,618 A | 3/1927 | Vervoort | |
| 2,068,240 A * | 1/1937 | Archibald | B60B 37/10 295/10 |
| 3,329,444 A | 7/1967 | Arthur | |
| 3,663,031 A | 5/1972 | Young | |
| 3,944,307 A | 3/1976 | Bingle | |
| 4,438,992 A | 3/1984 | Olschewski et al. | |
| 5,215,356 A | 6/1993 | Lin | |
| 5,313,817 A | 5/1994 | Meinders | |
| 5,797,661 A | 8/1998 | Lee et al. | |
| 6,135,475 A | 10/2000 | Brown et al. | |
| 6,220,411 B1 | 4/2001 | Scicluna et al. | |
| 6,322,156 B1 | 11/2001 | Kuo | |
| 6,626,453 B1 | 9/2003 | Theus et al. | |
| 7,014,272 B1 | 3/2006 | Williamson et al. | |
| 7,950,819 B2 * | 5/2011 | Wells | F21V 17/108 362/157 |
| 7,980,568 B2 | 7/2011 | Chen | |
| 8,118,146 B2 * | 2/2012 | Shalgi | A45C 5/03 190/18 A |
| 8,490,765 B2 | 7/2013 | Lee et al. | |
| 8,549,705 B1 * | 10/2013 | Wu | B60B 33/0028 16/45 |
| 8,561,258 B2 * | 10/2013 | Breyer | B60B 3/048 16/46 |
| 8,967,636 B2 * | 3/2015 | Horst | B62B 7/04 280/47.38 |
| 9,168,689 B2 | 10/2015 | Stoehr | |
| 9,820,541 B2 * | 11/2017 | King | A45C 5/14 |
| 2002/0178539 A1 | 12/2002 | Donakowski | |
| 2004/0000457 A1 | 1/2004 | Sanford-Schwentke | |
| 2005/0081329 A1 | 4/2005 | Tsai | |
| 2007/0007751 A1 | 1/2007 | Dayton et al. | |
| 2007/0034424 A1 | 2/2007 | Snowden et al. | |
| 2007/0186373 A1 | 8/2007 | Melara | |
| 2010/0018088 A1 | 1/2010 | Rajpal | |
| 2010/0025174 A1 | 2/2010 | Dayton | |
| 2010/0163359 A1 | 7/2010 | Shalgi | |
| 2010/0264048 A1 | 10/2010 | Gunsberg | |
| 2010/0306962 A1 | 12/2010 | Breyer et al. | |
| 2011/0120828 A1 | 5/2011 | King | |
| 2013/0087983 A1 | 4/2013 | Ngai | |
| 2013/0228408 A1 | 9/2013 | Lease et al. | |
| 2014/0076679 A1 | 3/2014 | Hughes | |

FOREIGN PATENT DOCUMENTS

| | | | | |
|---|---|---|---|---|
| DE | 202013006728 U1 * | 9/2013 | | H02K 35/02 |
| EP | 2080445 A2 | 7/2009 | | |
| GB | 373775 A * | 6/1932 | | F16C 33/54 |
| GB | 2492766 A | 1/2013 | | |
| JP | H01130801 A | 5/1989 | | |
| JP | H0545231 U * | 6/1993 | | F16C 33/526 |
| JP | 2001128719 A | 5/2001 | | |
| JP | 2004109451 A * | 4/2004 | | |
| JP | 2008526603 A | 7/2008 | | |
| JP | 2009500233 A | 1/2009 | | |
| JP | 2009504266 A | 2/2009 | | |
| WO | 9212017 A1 | 7/1992 | | |
| WO | 2005118314 A1 | 12/2005 | | |
| WO | 2006074474 A2 | 7/2006 | | |
| WO | 2007008316 A2 | 1/2007 | | |
| WO | 2007021851 A2 | 2/2007 | | |
| WO | 2011135391 A1 | 11/2011 | | |
| WO | 2013139495 A1 | 9/2013 | | |
| WO | 2015063752 A1 | 5/2015 | | |

OTHER PUBLICATIONS

Japanese Office Action for Application No. 2016-527254 dated Jan. 5, 2018 with translation, 8 pages.

PCT International Preliminary Report on Patentability dated Feb. 21, 2016 for International Application No. PCT/IL2013/050878, 12 pages.

PCT International Search Report and Written Opinion dated Jan. 12, 2014 for International Application No. PCT/IL2013/050878, 8 pages.

* cited by examiner

WHEELED LUGGAGE CASE

CROSS REFERENCE TO RELATED APPLICATIONS

This application is a continuation of U.S. patent application Ser. No. 15/031,737, filed Apr. 24, 2016, which is a 371 U.S. National Stage of International Application No. PCT International Application No. PCT/IL2013/050878, filed Oct. 28, 2013. The disclosure of each of the above applications is incorporated herein by reference in their entirety.

FIELD OF THE INVENTION

The present invention relates to wheeled luggage, and, more specifically, to a case provided with an axle-free labyrinth wheels.

BACKGROUND OF THE INVENTION

A suitcase is a general term for a distinguishable form of luggage. It is mostly common shape is flat, rectangular bag with impact-proof corners, either metal, hard plastic, semi hard or made of cloth, polymers, composite materials leather or any combination thereof. It has a carrying handle and is used mainly for transporting clothes and other possessions during trips. It has an opening side for access to its content and the different sections.

Many modern suitcases have built-in small wheels enabling them to be rolled along on surfaces by a fixed or extendable handle or by a retractable or stowable leash.

It is known a technical solution disclosed in U.S. Pat. No. 8,118,146, according to which a wheeled luggage case has a pair of freely rotating large wheels characterized by a diameter substantially greater than the height of the center of gravity of the wheeled luggage case itself (when in an upright, at rest position). The weight of the wheeled luggage case is largely transferred to the large wheel pair when being towed, reducing the load burden on a user and making it easier to pull the wheeled luggage case over long distances, for example, between airport terminals.

While in operation, rotating articles of the wheels are covered with dust and wheel rotation is hampered. Thus, there is a long-left and unmet need to provide a wheeled luggage case which ensure safe operation in dusty, icy, wet, humid, uneven surface, snow and slippery conditions.

SUMMARY OF THE INVENTION

It is hence one object of the invention to disclose a labyrinth axle-free wheel. The aforesaid said wheel comprises (a) an internal rim; (b) an external rim provided with a ground interface; (c) rollers being rotatably disposed within a roller spacer between said internal and external rims in a uniform circumferential manner by means of a spacer; and (d) external covers.

It is a core purpose of the invention to provide a labyrinth dust passage defined by said rims and said external plates mechanically connected to said internal rim.

It is another object of the invention to disclose at least one of the rims is provided with dust chambers circumferentially distributed over the rim.

It is further object of the invention to disclose the rollers disposed within a roller spacer having two side planar annular members. The members are provided with dust chambers circumferentially distributed thereover.

It is a further object of the invention to disclose the annular members interconnected by means of pintles circumferentially distributed over the member which carry the rollers.

It is a further object of the invention to disclose at least one roller provided with at least one a dust-gathering groove.

It is a further object of the invention to disclose the external covers are provided with at least one dust chambers circumferentially distributed over the cover.

It is a further object of the invention to disclose a wheeled luggage case comprising: (a) a storage chamber; (b) a cover defining an opening on at least one side of the storage chamber for providing ready access therein; and at least two labyrinth axle-free wheels operatively connected to the chamber for towing the case along a ground surface.

It is a further object of the invention to disclose case comprising an electric generator kinematically linked to the wheel configured for energizing a load connectable to the generator.

It is a further object of the invention to disclose the case comprising a rechargeable internal battery.

It is a further object of the invention to disclose the case comprising an internal compartment configured for accommodating the battery therewithin.

It is a further object of the invention to disclose the case comprising at least one ball bearing configured for supporting and moving the case in an upright position.

It is a further object of the invention to disclose the case comprising an embedded control unit configured for controlling at least one parameter selected from the group consisting of battery charging, internal temperature and cooler operation.

It is a further object of the invention to disclose the case comprising a display configured to display parameters controlled by the controller.

It is a further object of the invention to disclose the case having two covering flaps openable in opposite directions.

It is a further object of the invention to disclose the case provided with at least one external light configured for illuminating a user's path and enhancing safety thereof.

It is a further object of the invention to disclose the case provided with at least one internal light configured for illuminating an internal space of the case.

It is a further object of the invention to disclose the chamber made of a translucent material; said case further comprises internal or external lighting means configured for change in color of the case.

It is a further object of the invention to disclose the case comprising a telescopically protrudable handle.

It is a further object of the invention to disclose the telescopically protrudable handle which is radially configured.

It is a further object of the invention to disclose the control unit comprising a GPS chip.

It is a further object of the invention to disclose the control unit comprising RFID chip.

It is a further object of the invention to disclose the control unit comprising a USB interface/connector.

It is a further object of the invention to disclose the case comprising cooling mans controlled the control unit.

It is a further object of the invention to disclose the case comprising expanding means configured for gaining a volume of the case.

It is a further object of the invention to disclose the expanding means selected from the group consisting of a telescopic member embedded into the frame, a spring-loaded member, a zipper and any combination thereof.

It is a further object of the invention to disclose the case comprising at least one internal compartment configured for accommodating a specific kind of articles.

It is a further object of the invention to disclose the compartment marked with a symbol identifying the specific kind of articles.

It is a further object of the invention to disclose the case comprising at least one adjustable strap configured for holding user's articles within the compartment.

It is a further object of the invention to disclose the case comprising an adapter for towing by means of a bicycle.

It is a further object of the invention to disclose the adapter comprises a clamp embracing a frame of said bicycle, a clamp embracing said telescopically protrudable handle and a rigid link therebetween.

It is a further object of the invention to disclose the two labyrinth axle-free wheels mounted flush with side wall of said case.

It is a further object of the invention to disclose the each of said labyrinth axle-free wheels provided with a deploying mechanism having a collapsed position and a deployed position.

It is a further object of the invention to disclose the deploying mechanism comprising a member configured for attaching said labyrinth axle-free wheel and lever arms hingedly interconnecting said annular member and said side wall of said case.

It is a further object of the invention to disclose the lever arms having a first steady position parallel to said side wall of said case and a second steady position in which said arms are rotated by an obtuse angle with said first position.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a labyrinth axle-free wheel and a luggage case provided with the aforesaid labyrinth axle-free wheels.

The term "labyrinth axle-free wheel" refers hereinafter to a wheel mechanically attachable to a planar plane, whereat a wheel plane is parallel to the plane of attachment.

The term "ground interface" refers hereinafter to a member circumferentially distributed over the external rim and which is able to be in contact with the ground.

Figure 1:
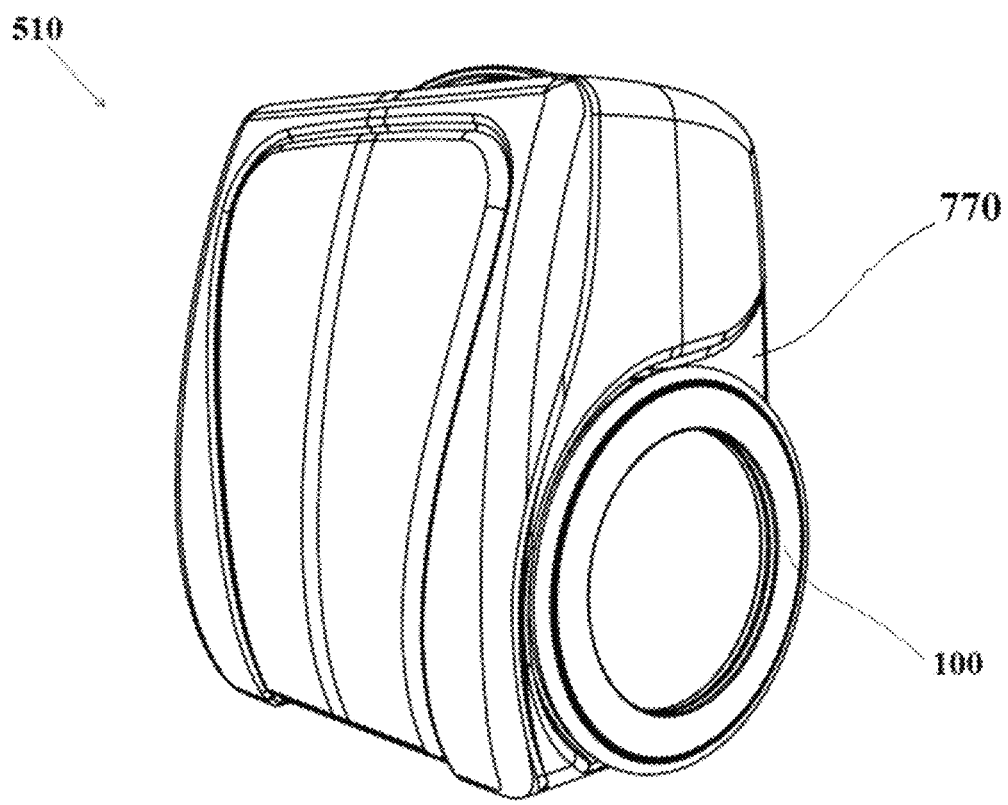
FIG. 1 is a general view of an axle-free wheel case.

Reference is now made to FIG. 1, presenting a general view of a wheeled case 510 provided with a pair of labyrinth axle-free wheel 100 mounted flush with case wall within a slot 770.

Figure 2:
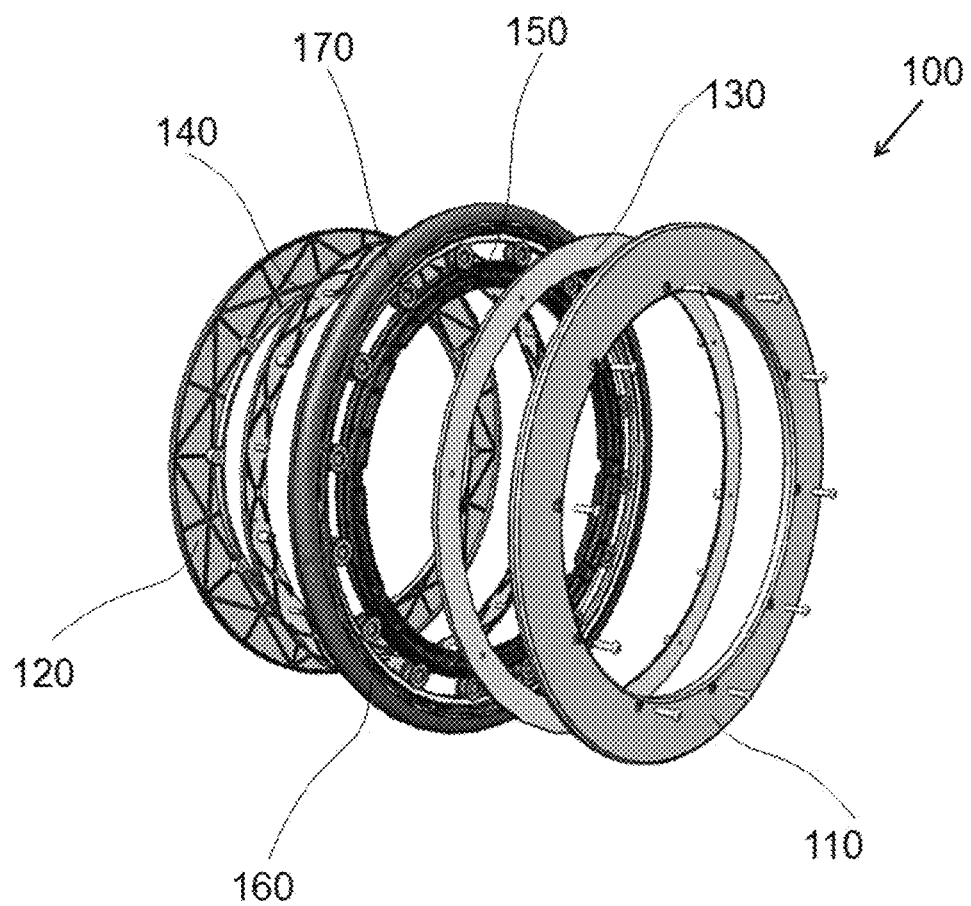
FIG. 2 is an isometric exploded view of an axle-free wheel.

Reference is now made to FIG. 2, presenting an exploded view of a labyrinth axle-free wheel 100 which includes an external rim 160 provided with a ground interface, an internal rim 150, a rollers 170 rotatably disposed within a roller spacer consisting of two mechanically tied together annular members 130 and 140. Annular members 110 and 120 cover the wheel on the sides. The wheel articles are mechanically assembled together and attached to a planar plane (not shown).

Figure 3:
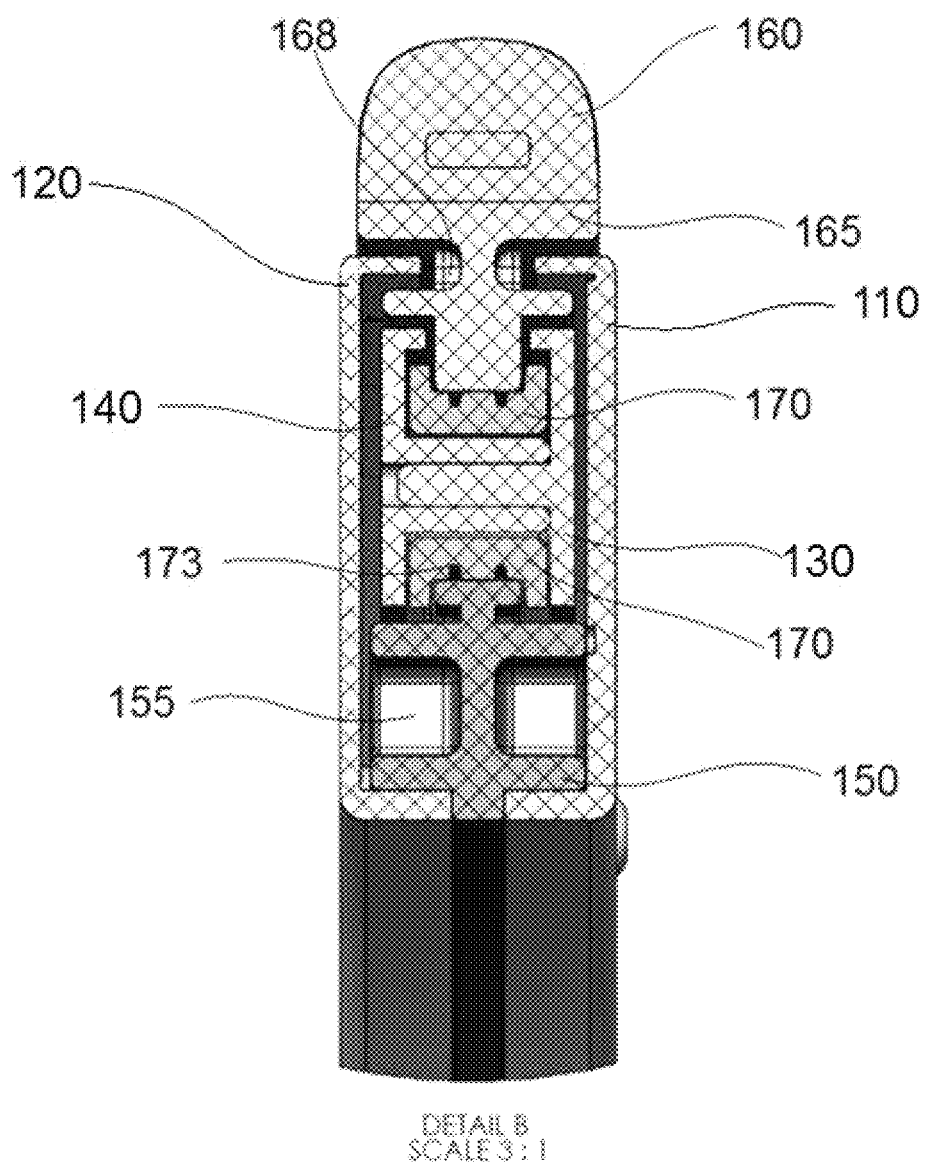
FIG. 3 is a partial cross-sectional view of an axle-free wheel.

FIG. 3 presenting an enlarged partial cross-sectional view of the wheel 10 specifies a labyrinth dust configuration. The labyrinth is defined by annular members 110 and 130 on the right side and 120 and 140 on the left side, the internal rim 150 and the external rim 165. The dust is adhered to internal surfaces of members 110, 120, 130 and 140 which as shown below are provided with special dust chambers. Additionally, the external rim 165 is provided with a dust chamber 168 and the internal rim 150 with a dust chamber 155. Optionally, the rollers 170 can be provided with at least one circumferential groove 173.

Figure 4:
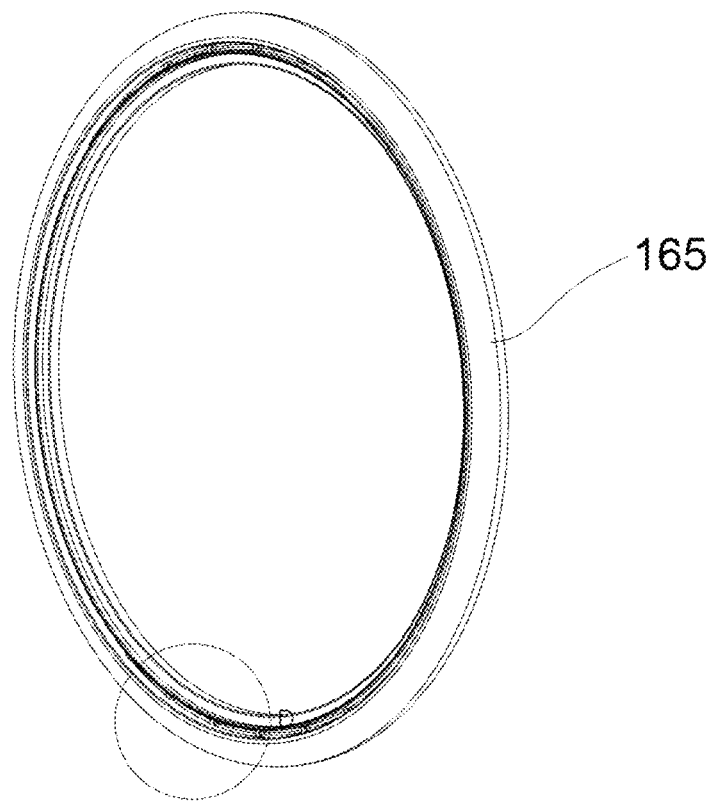
FIGS. 4 and 5 are general and enlarged partial views of an external rim, respectively.
Figure 5:
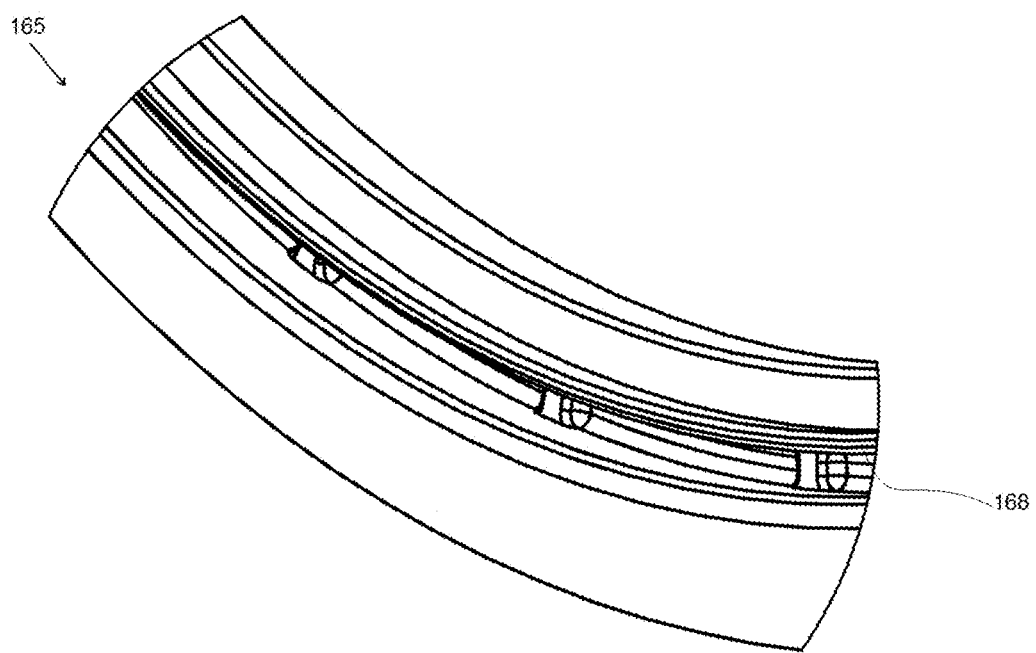

Reference is now made to FIGS. 4 and 5 presenting general and enlarged views of the external rim 165. The enlarged view specifies geometric configuration of dust chambers 168 circumferentially distributed over the rim 165.

Figure 6:
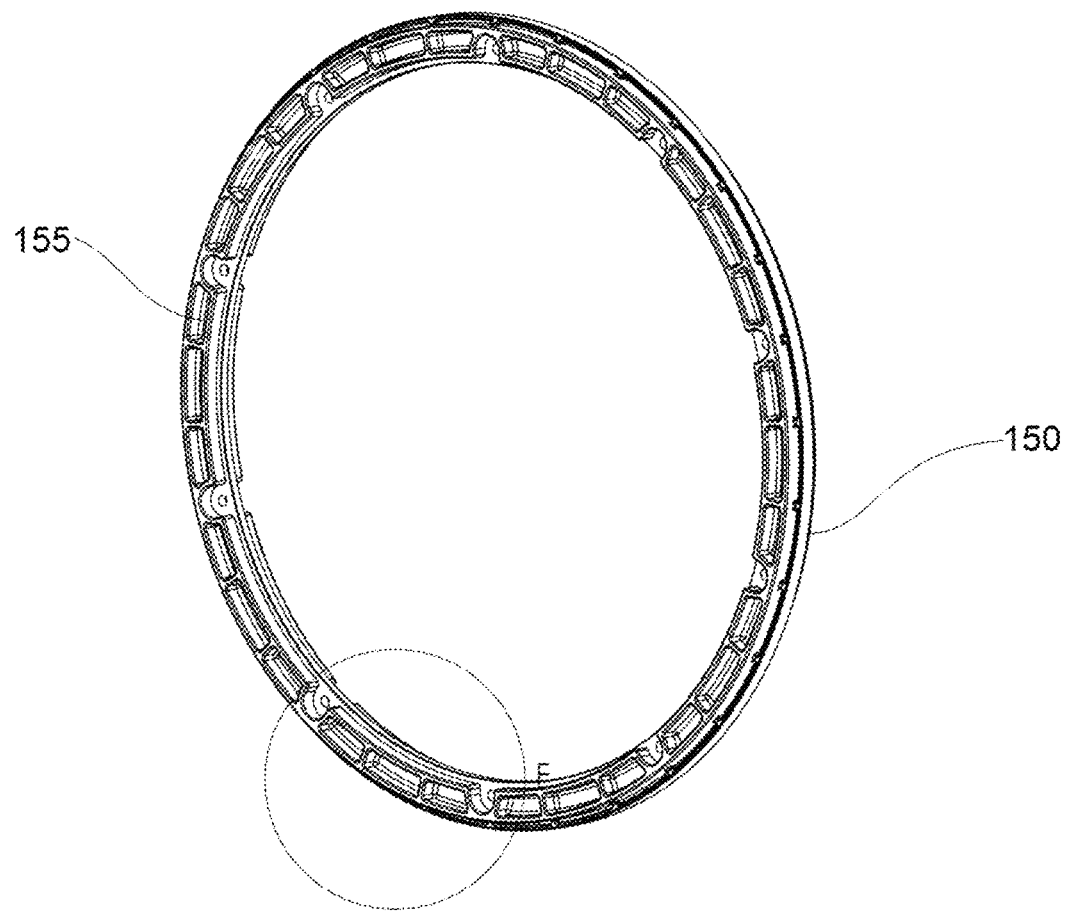
FIGS. 6 and 7 are general and enlarged partial views of an internal rim, respectively.
Figure 7:
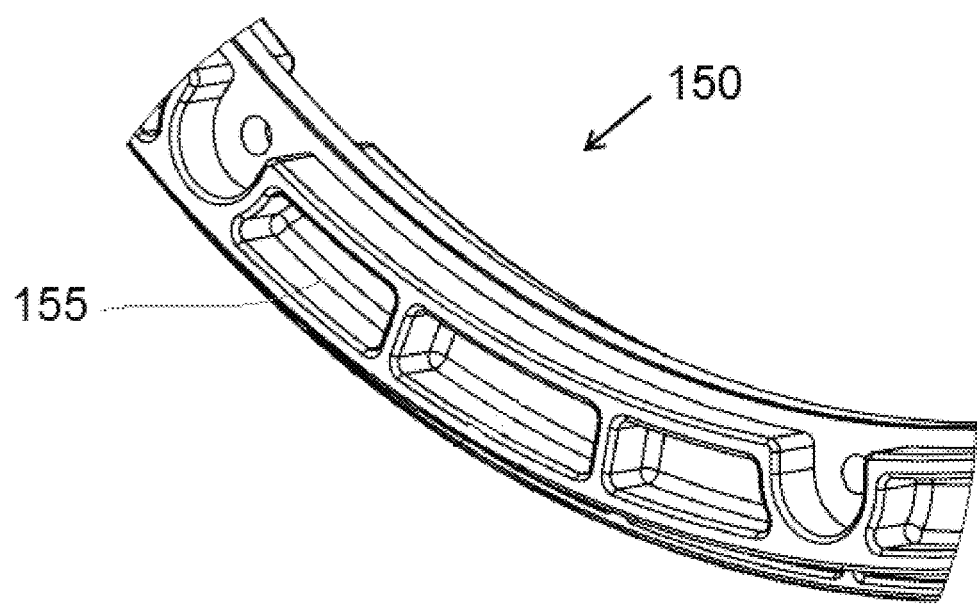

Reference is now made to FIGS. 6 and 7 presenting general and enlarged views of the internal rim 150. The enlarged view specifies geometric configuration of dust chambers 155 circumferentially distributed over the rim 150.

Figure 8:
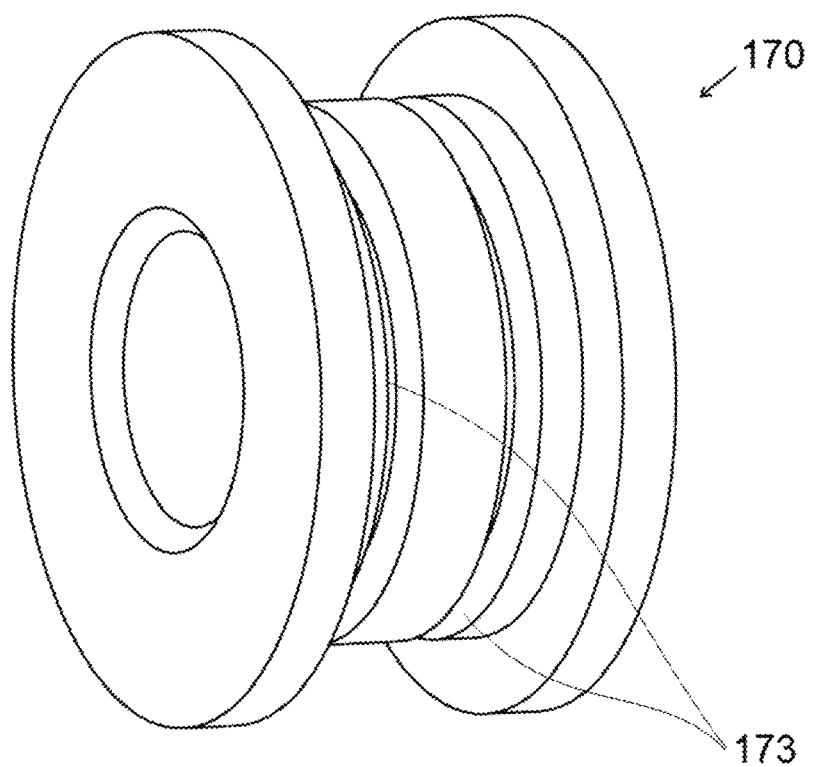
FIG. 8 is an isometric view of a roller.

Reference is now made to FIG. 8 presenting a general view of the roller 170 which, according to one embodiment of the present invention is provided with at least one groove 173 which serves for dust gathering in proximity of the roller 170 preventing the roller 170 from jamming due to dust obstruction.

Figure 9:
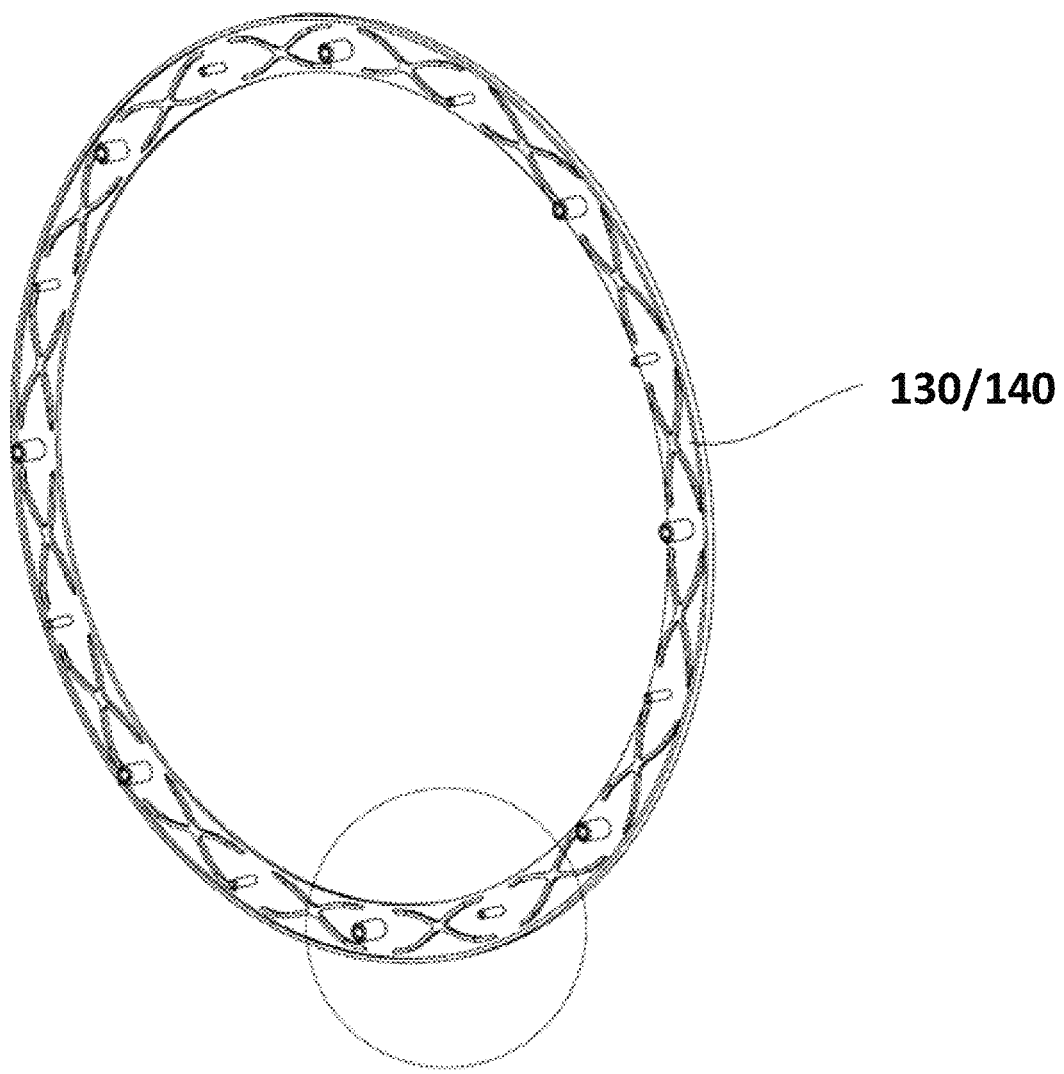
FIGS. 9 and 10 are general and enlarged partial views of annular members, respectively.
Figure 10:
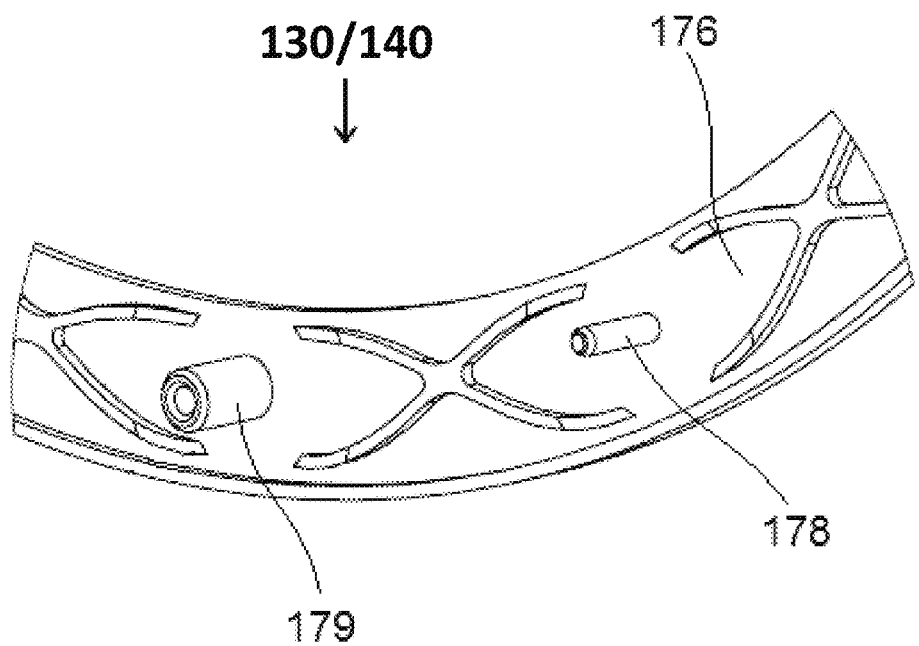

Reference is now made to FIGS. 9 and 10, presenting general and enlarged views of the separator annular member 130/140. The enlarged view specifies geometric configuration of dust chambers 176 circumferentially distributed over the separator annular member 130/140. When assembled, the member 130 is angularly displaced relative to the member 140 such that an entire pintle 178 is inserted into a slot pintle 179.

Figure 11:
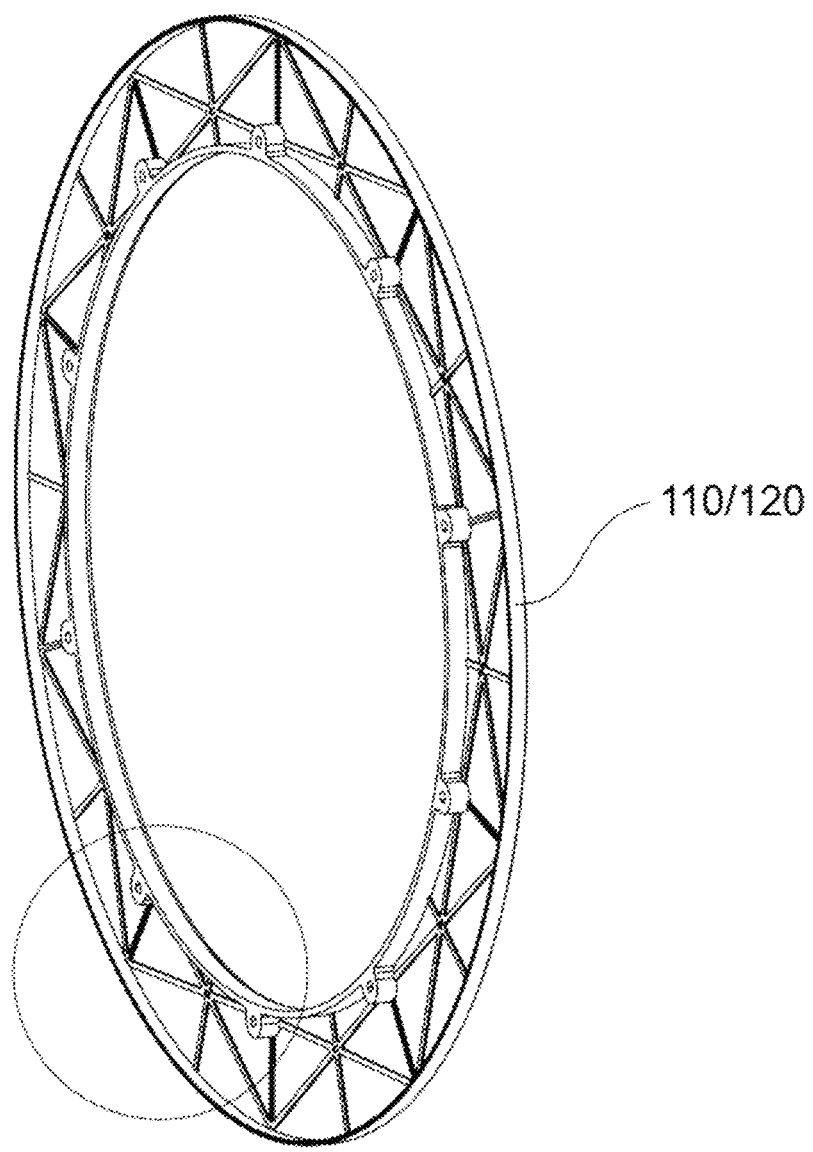
FIGS. 11 and 12 are general and enlarged partial views of external plates, respectively.
Figure 12:
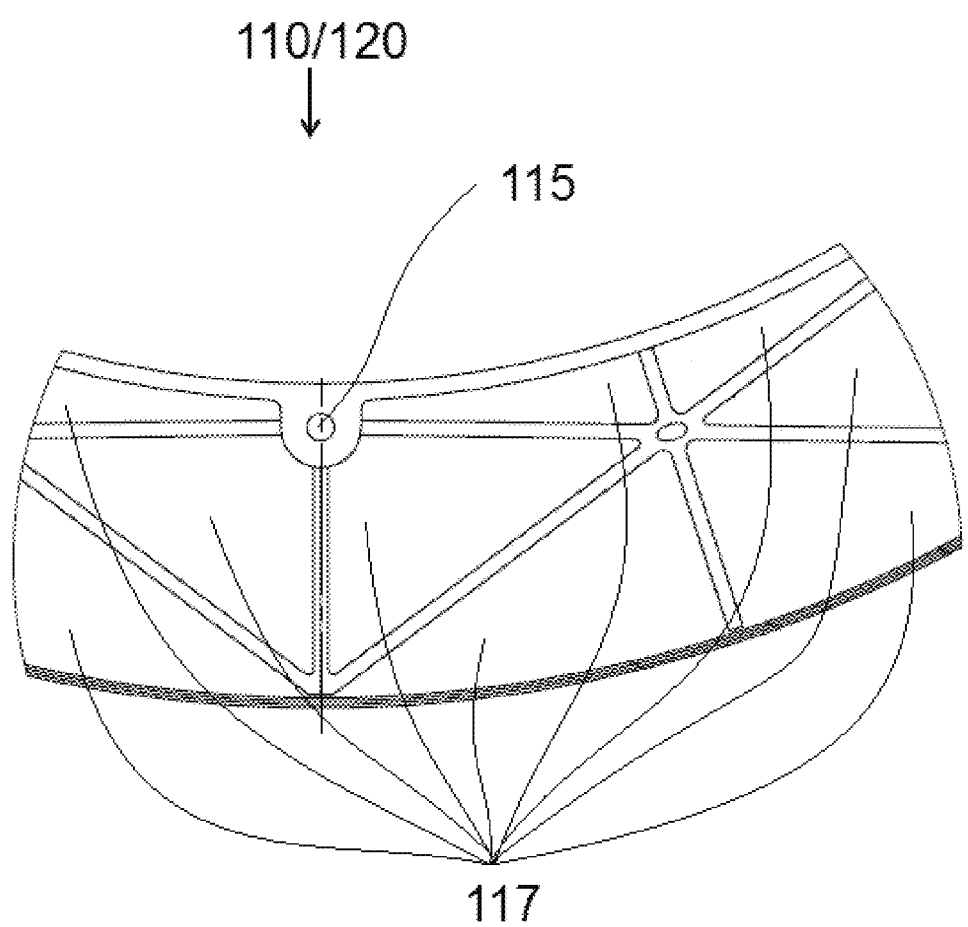

Reference is now made to FIGS. 11 and 12, presenting general and enlarged views of the external cover annular member 110/120. The enlarged view specifies geometric configuration of dust chambers 117 circumferentially distributed over the external annular member 110/120.

Figure 13:
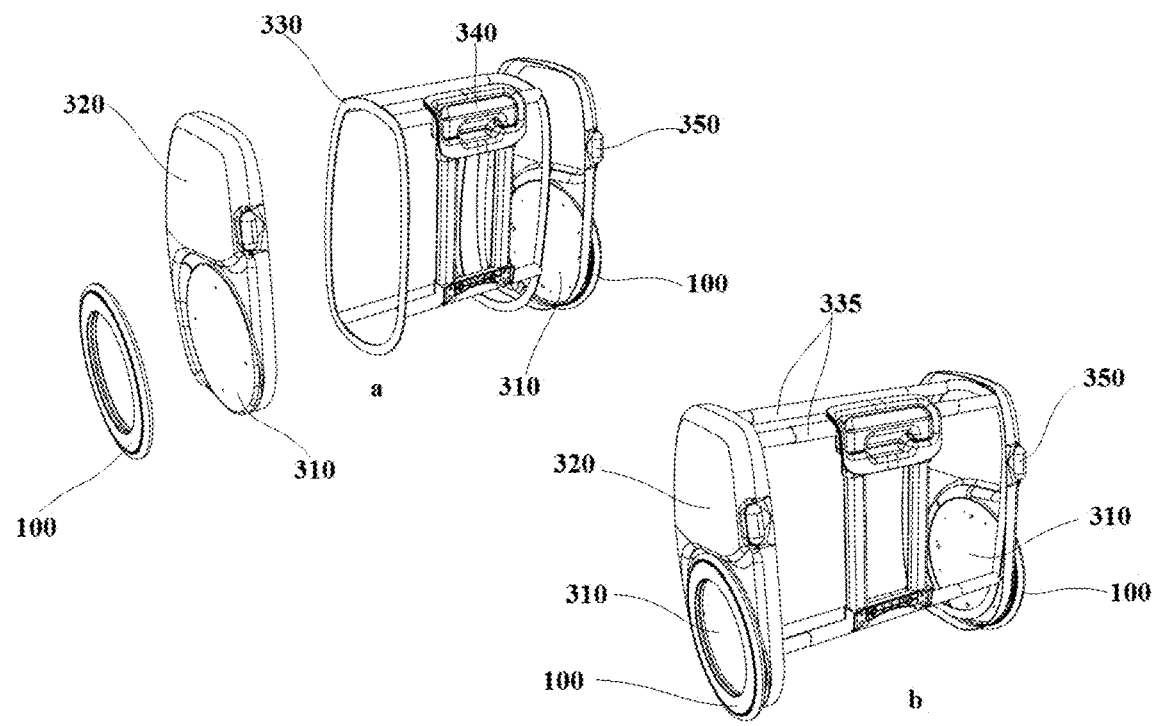
FIG. 13 is an isometric exploded view of a side expandable wheeled case.

Reference is now made to FIGS. 13a and 13b presenting views of a side expandable wheeled luggage case. In accordance with one embodiment of the present invention, the luggage case comprises a telescopically expandable frame 330 coated with a cover material, side walls 320 with a mounting face 310 configured for mounting the wheel 100. Numeral 335 refers to a telescopic mechanism in an expanded position. The side walls 320 are provided with members 350 supporting the case in a horizontal position (for example, when the case is opened). According to one embodiment of the present invention, the members 350 can be replaced with ball bearing members (not shown) enabling case towing in the horizontal position. The luggage case is moved by a user by means of telescopically configured extension handle 340.

Figure 14:
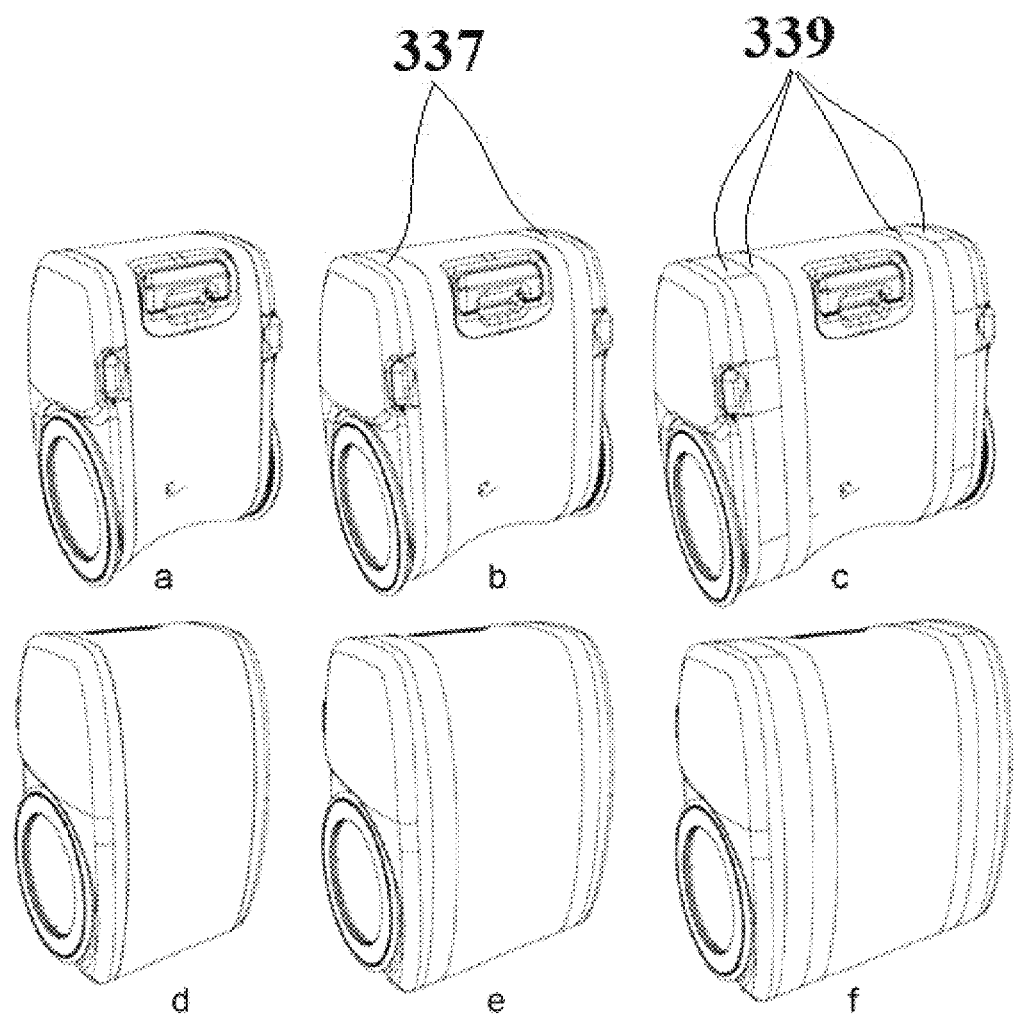
FIG. 14 illustrates side extendable expandable wheeled cases in unexpanded (rear view is "a" and front view is "d"), semi-expanded (rear view is "b" and front view is "e"), and fully expanded position (rear view is "c" and front view is "f")

Reference is now made to FIG. 14, presenting differently expanded luggage cases. Specifically, in an exemplar manner, areas 337 or 339 can be expanded by means of unzipping the aforesaid areas (not shown). Expanding means such as telescopic members embedded into said frame, spring-loaded members and others in the scope of the present invention.

Figure 15:
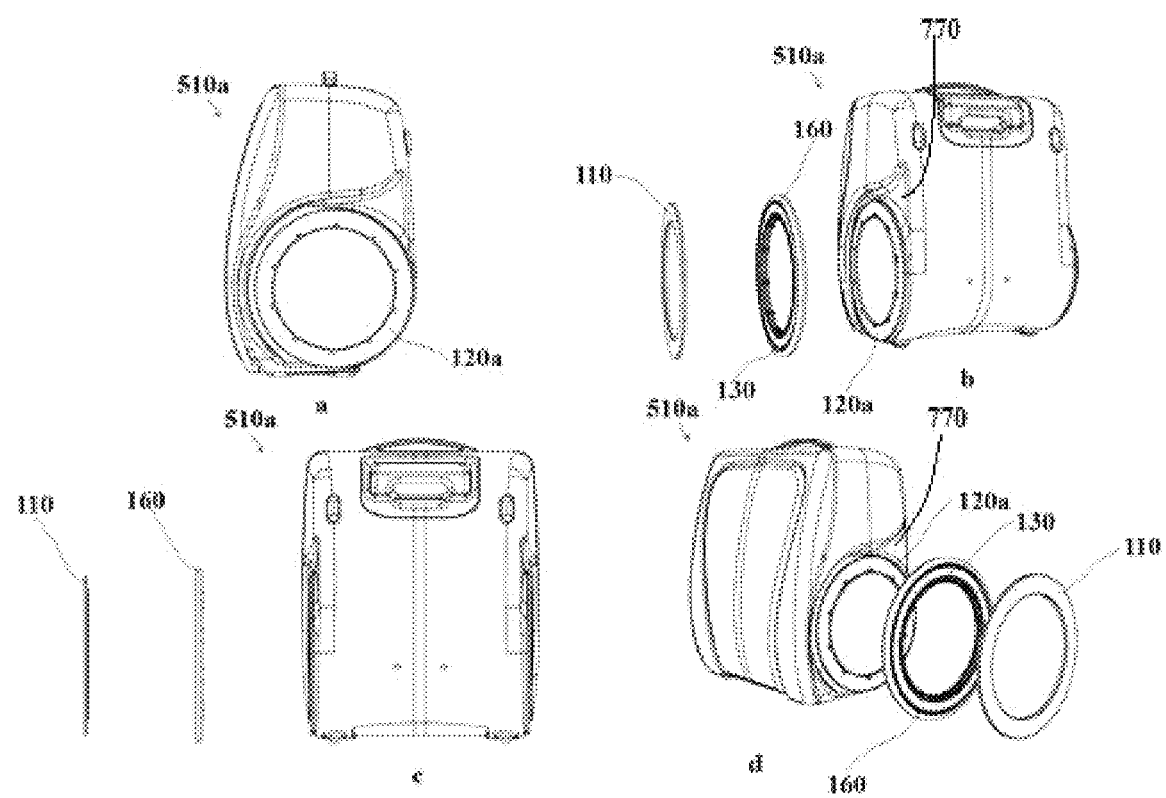
FIG. 15 includes isometric exploded views of axle-free wheel case provided with a receiving plate (side view is "a," rear perspective view is "b," rear view is "c," and front perspective view is "d")

Reference is now made to FIG. 15, showing a specific embodiment of the present invention provided with an external cover member 120a built into a slot 770 which is a part of the case wall.

Figure 16:
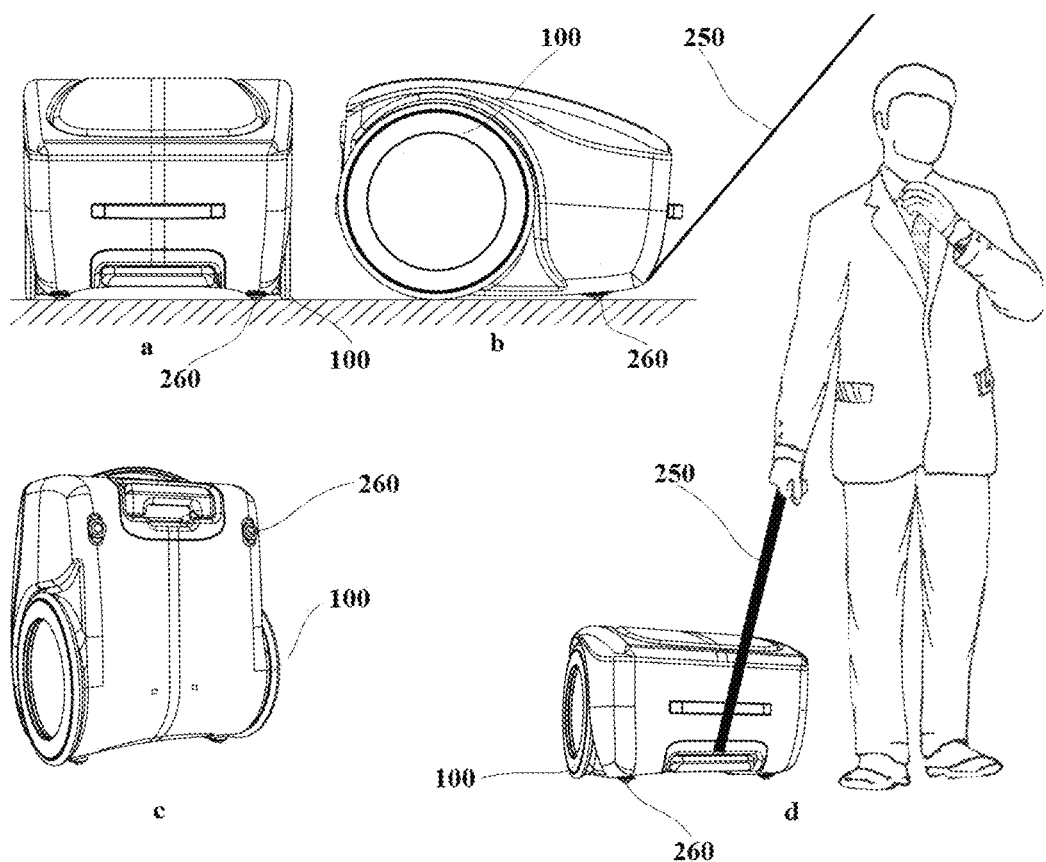
FIG. 16 includes schematic views of a cord-driven wheeled case.

Reference is now made to FIG. 16, showing a further embodiment of the present invention towable in a horizontal position by means of a cord 250. The luggage case is moved on wheels 100 and ball bearing rotatable supporting members 260.

Figure 17:
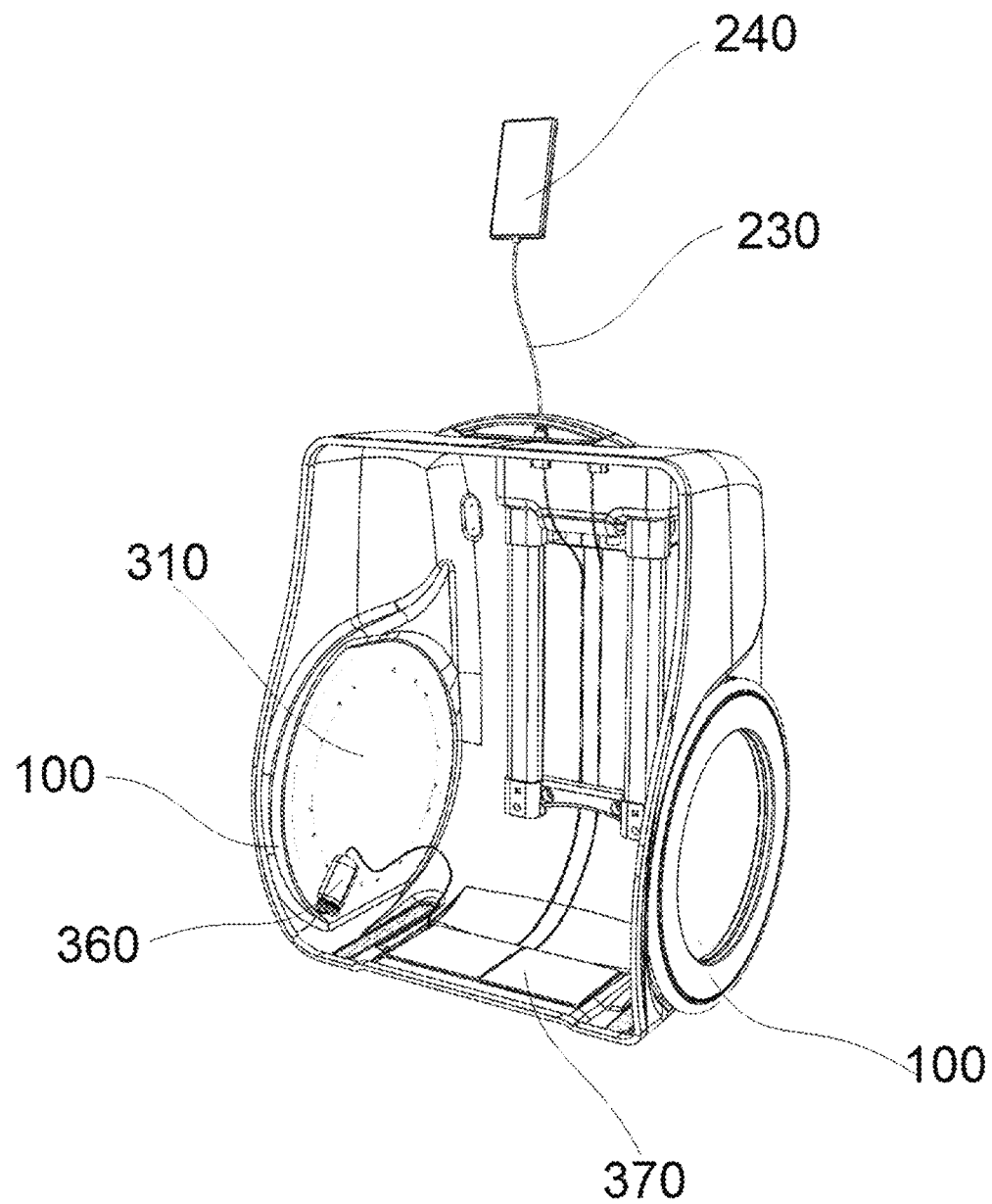
FIG. 17 is an isometric internal view of a wheeled case provided with an electric generator.

Reference is now made to FIG. 17, presenting a schematic internal view of the luggage case. An electric generator 360 is in a rotational connection with the wheel 100, such that when a user moves the luggage case, the generator 360 charges a battery 370 which can be used for further charging user's mobile devices 240 via USB-connector.

Figure 18:
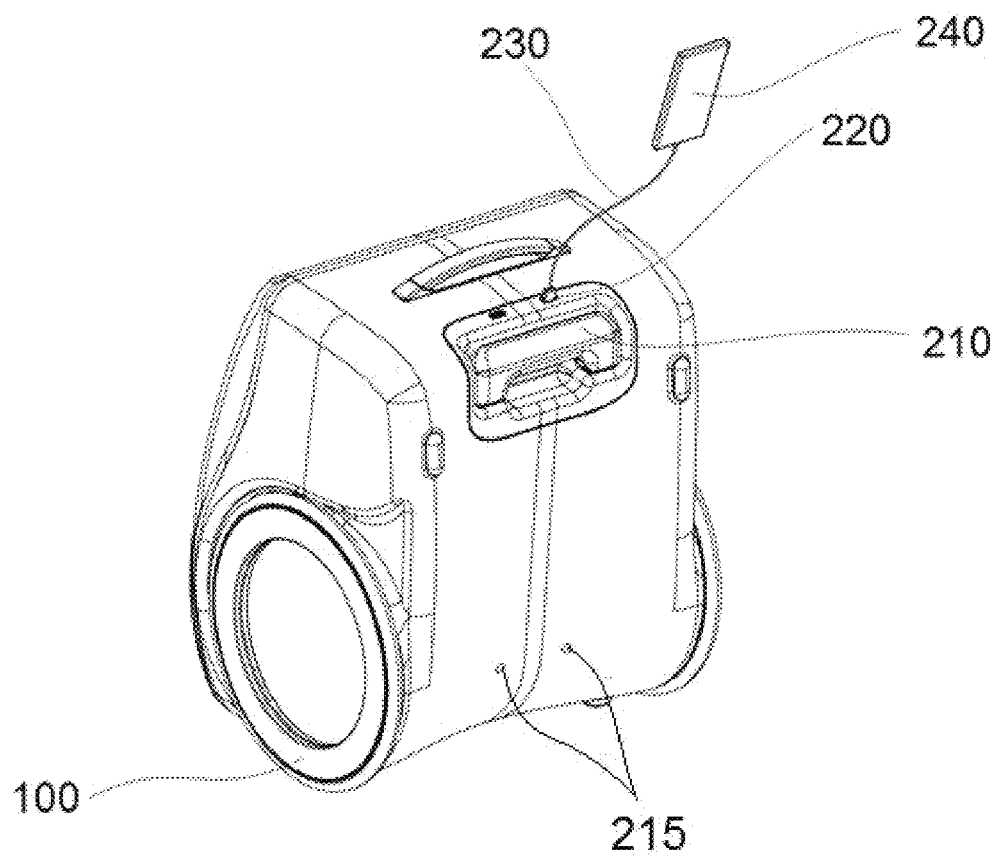
FIGS. 18 and 19 are general and enlarged partial views of a wheeled case provided with a USB port, respectively.
Figure 19:
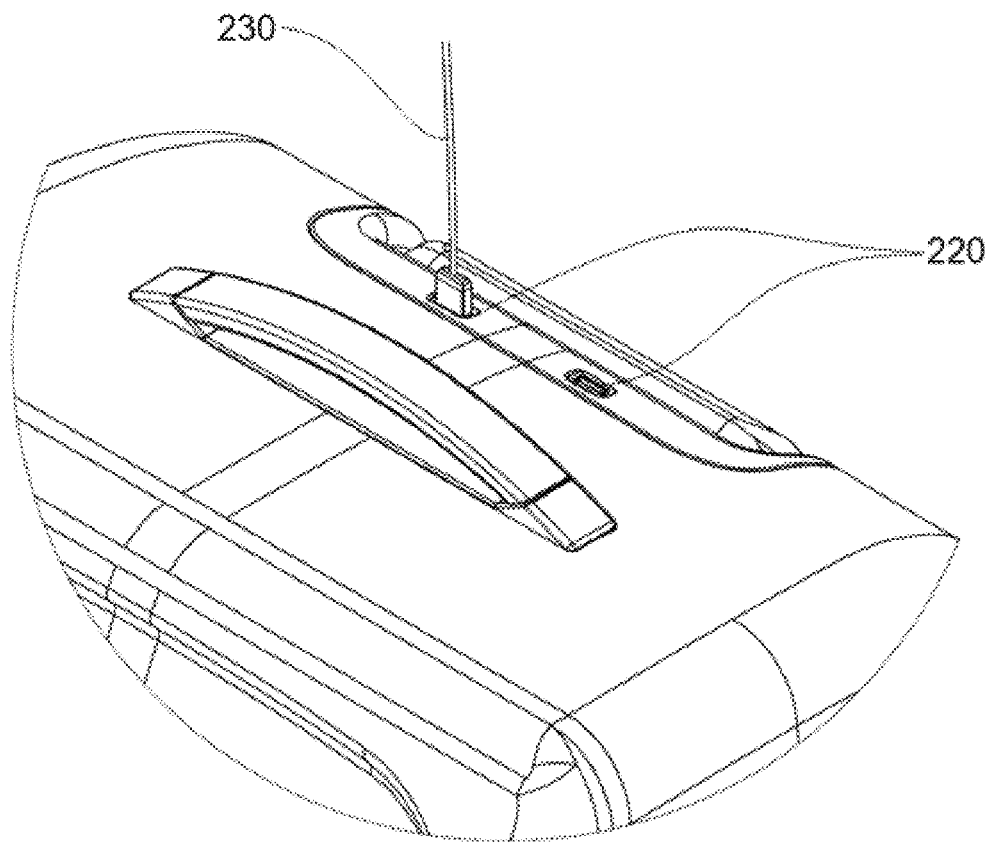

Reference is now made to FIGS. 18 and 19, presenting a wheeled luggage case with axle-free wheels 100. The luggage case is provided with a waterproof USB-connector 220 for charging a mobile device 240. The aforesaid device 240 is connected to the USB-connector 220 by means of a cable 230. Numeral 215 refers to external lights configured for illuminating a user's path and enhancing convenience and safety of case use.

Figure 20:
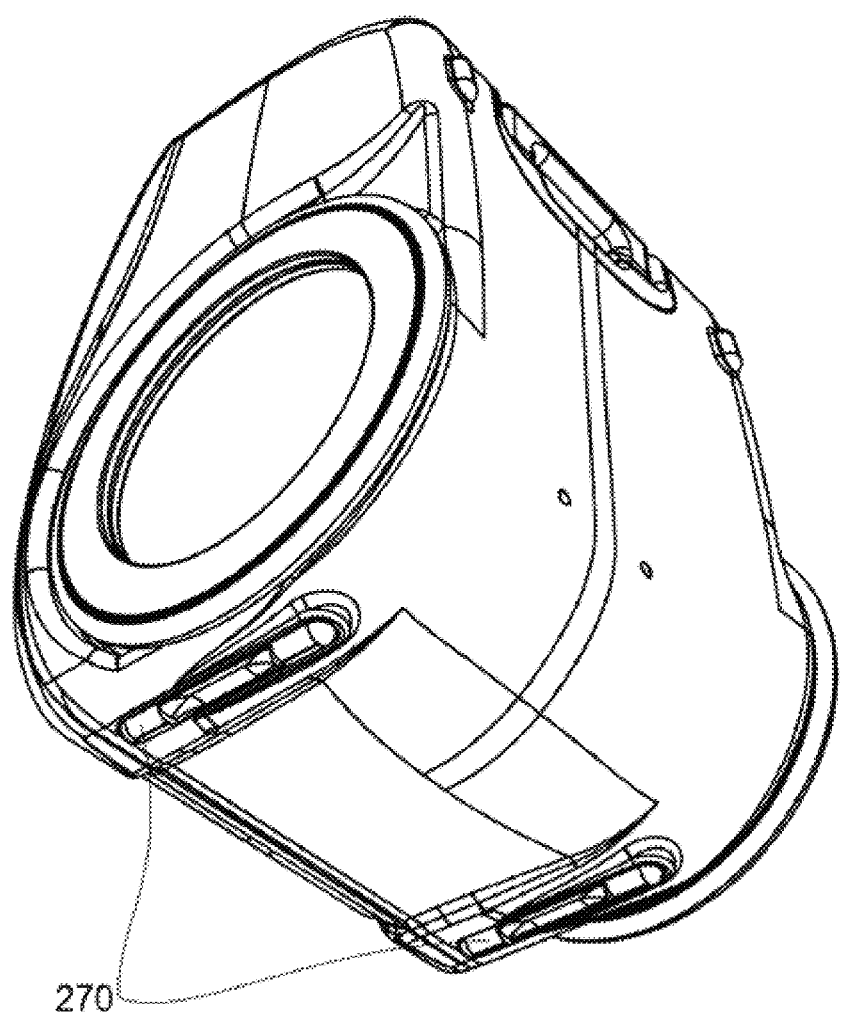
FIG. 20 is a bottom view of a wheeled case provided with fixed supporting members.
Figure 21:
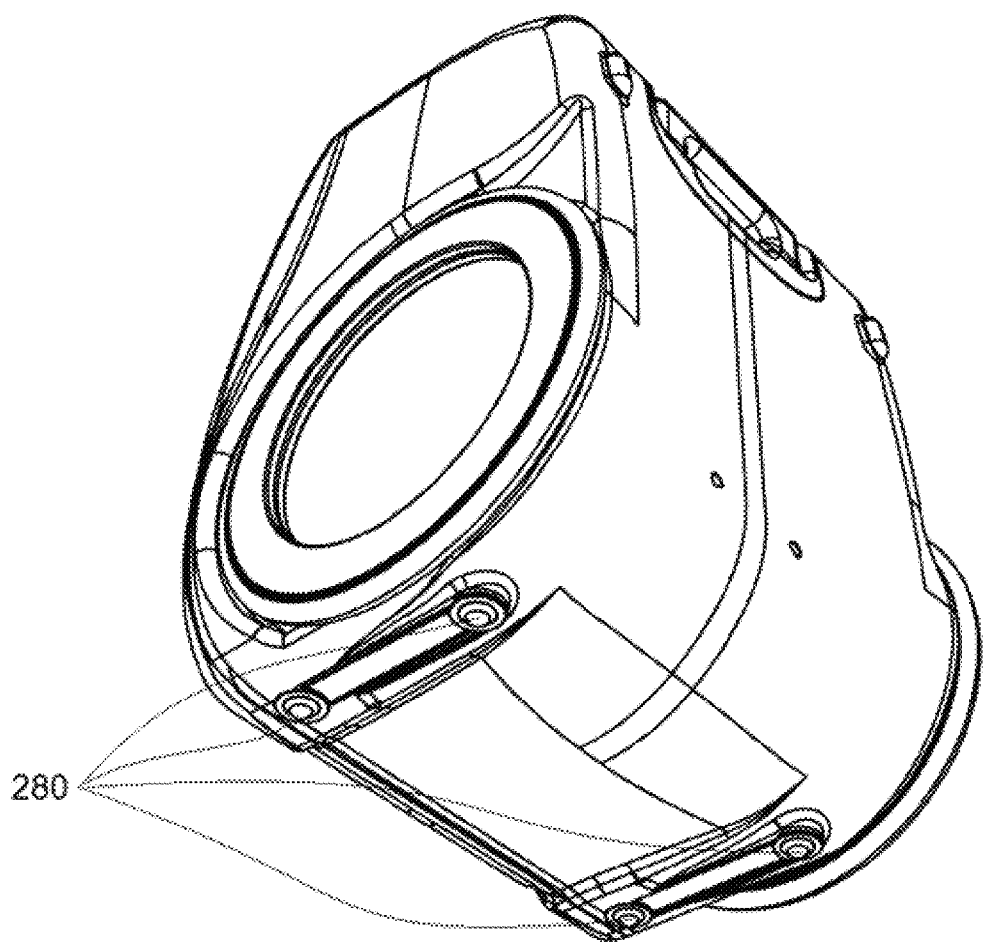
FIG. 21 is a bottom view of a wheeled case provided with ball bearing members.

Reference is now made to FIGS. 20 and 21 presenting alternative embodiments of the present invention. In FIG. 20, supporting members 270 provide a steady upright position of the wheeled luggage case. According to FIG. 21, the luggage case is movable in the upright position on ball bearing supporting members 280 along the ground surface.

Figure 22:
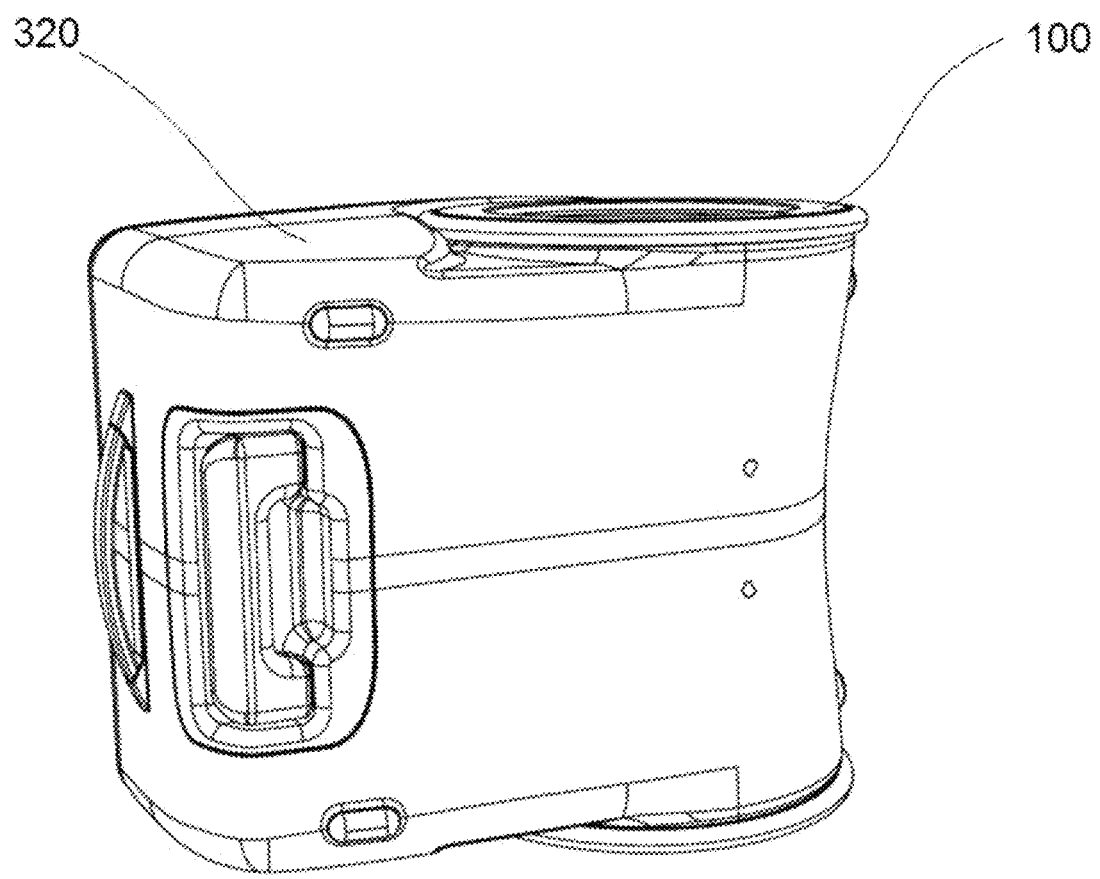
FIG. 22 is a side view of a wheeled case placed side along.

Reference is now made to FIG. 22, illustrating an option of placing the luggage case side along on the axle-free wheel. It should be emphasized that the axle-free wheel 100 is flush-mounted with the side wall 320.

Figure 23:
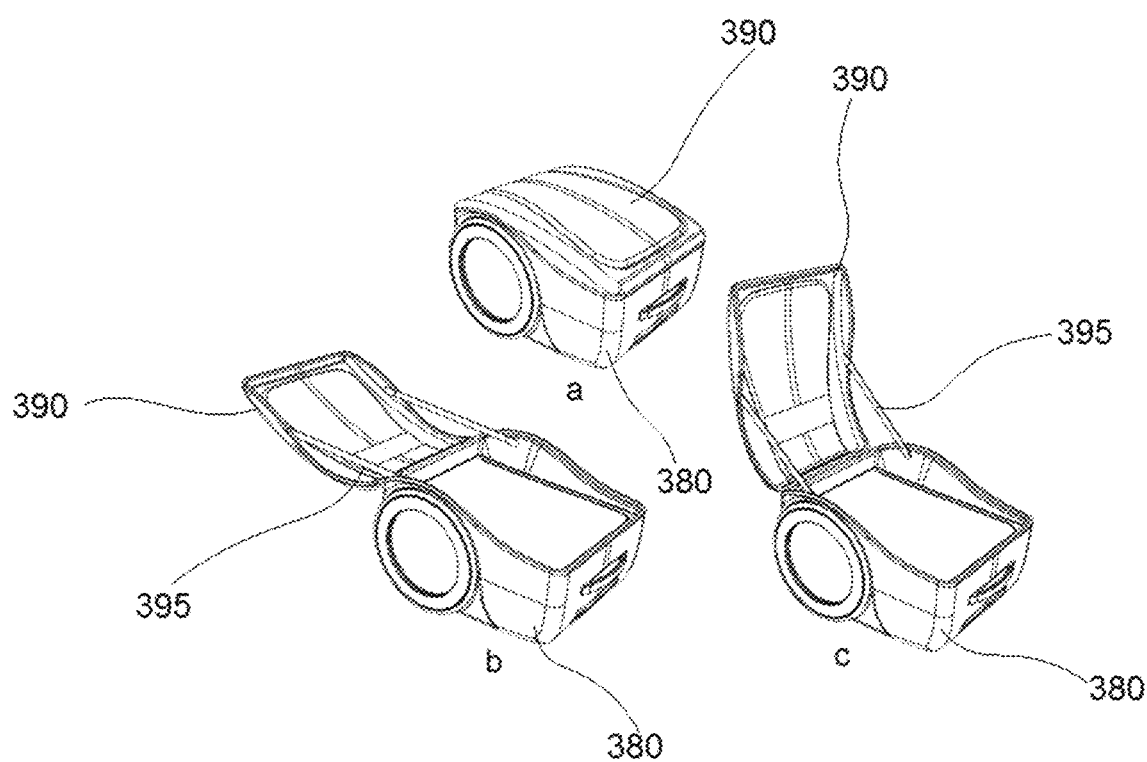
FIG. 23 includes isometric views of a wheeled case in closed ("a"), open ("b"), and semi-opened positions ("c")

Reference is now made to FIG. 23 illustrating a further embodiment of the present invention. The wheeled luggage case comprises a main housing 380 and a covering member 390 interconnected by a connecting means 395 limiting opening the covering member 390.

Figure 24:
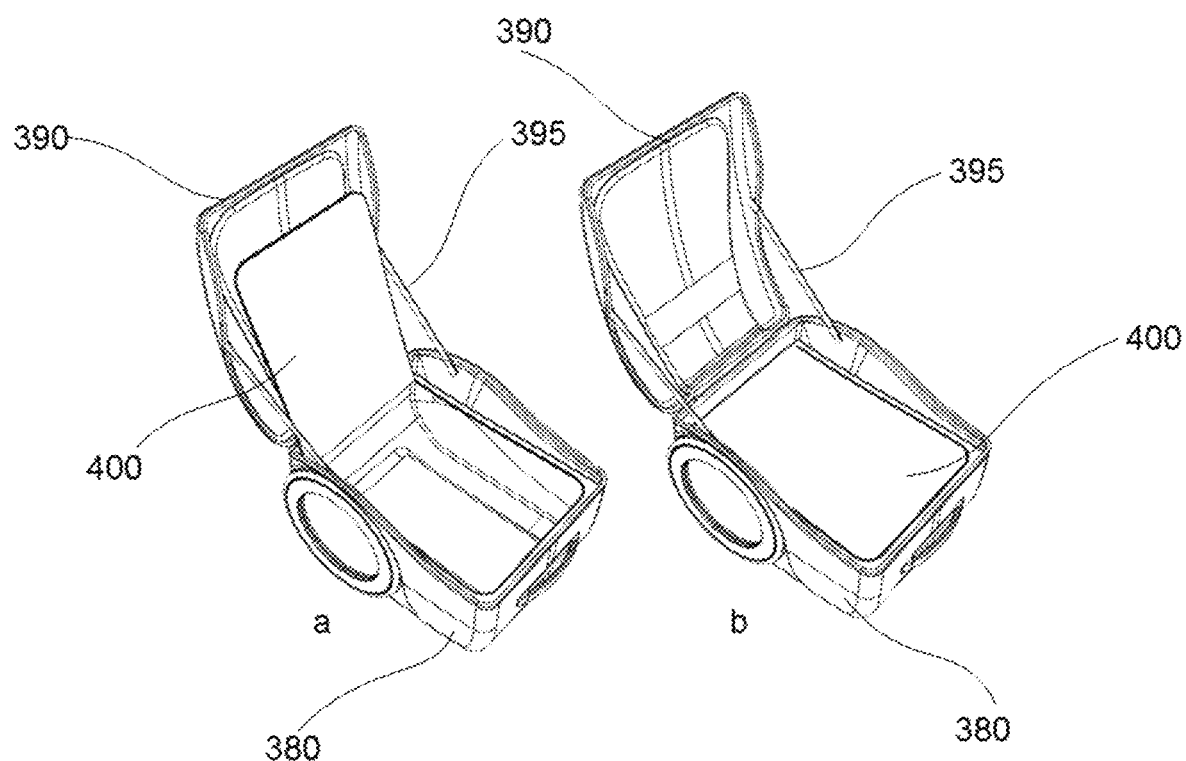
FIG. 24 includes isometric internal views of a compartmented wheeled case.

Reference is now made to FIG. 24, presenting partitioned by at least one divider 400. Compartmentalization of the luggage case provides additional convenience to the user.

Figure 25A:
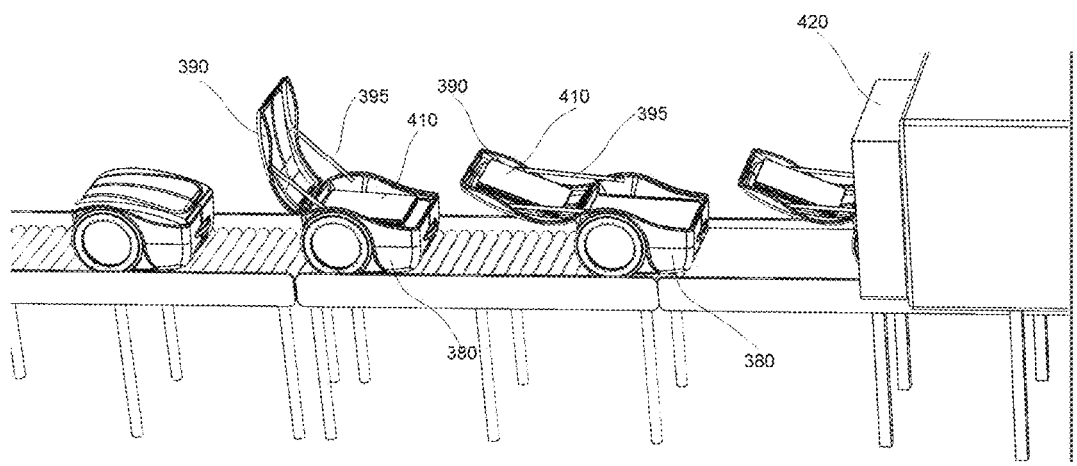
FIGS. 25A and 25B illustrate an X-ray security procedure.
Figure 25B:
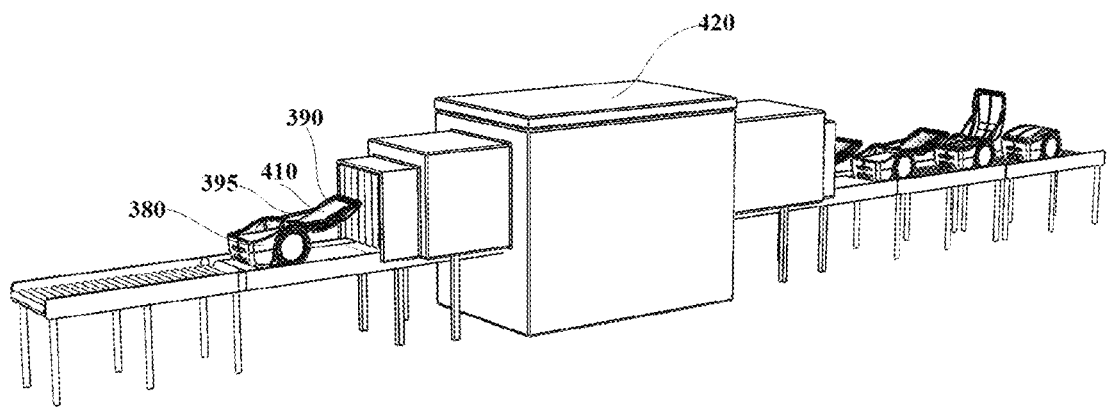

Reference is now made to FIGS. 25A and 25B illustrating an X-ray security procedure. The wheeled luggage case of the present invention provides an additional option of security check in opened position in an X-ray check machine 420. Specifically, a portable computer 410 or other mobile device may be placed in the main housing 380 or in the covering member 390 in a position open for any inspection.

Figure 26:
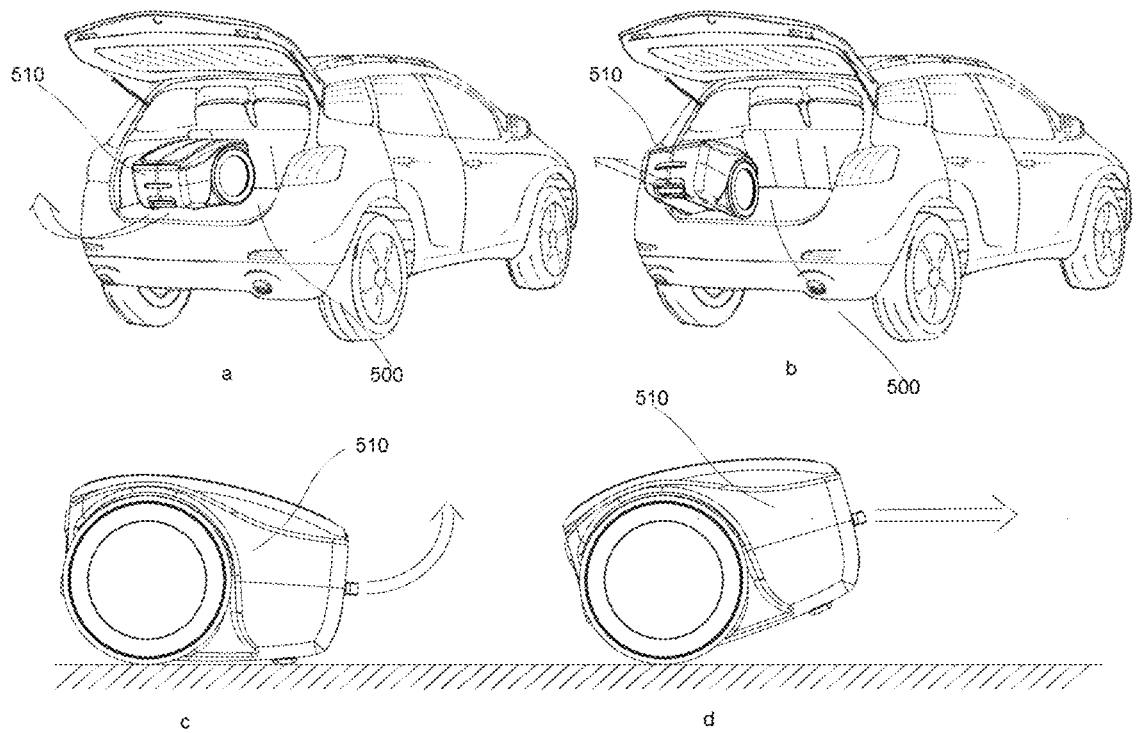
FIG. 26 illustrates withdrawing a wheeled luggage case from a car trunk.

Reference is now made to FIG. 26 illustrating withdrawal a wheeled luggage case 510 from a car trunk 500. It should be emphasized that the case 510 possesses additional convenience when it is placed into and withdrawn from the car trunk 500. Specifically, when a portion of the case 510 provided with a handle is slightly raised (see "a" and "c"), the case 510 is easily moved on the wheels (see "b" and "d").

Figure 27:
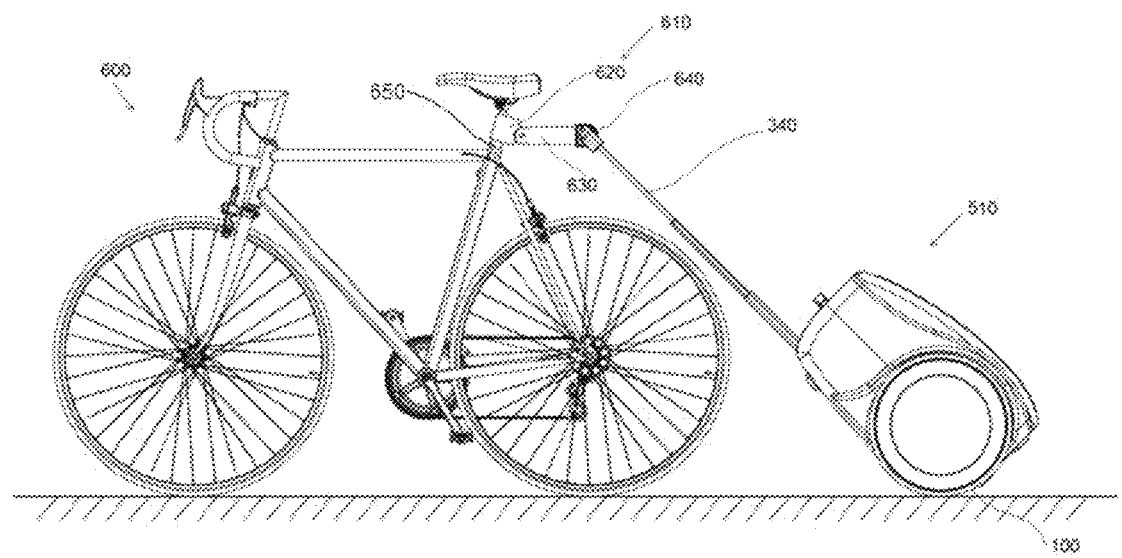
FIGS. 27 and 28 illustrate an embodiment of the present invention towed by a bicycle.
Figure 28:
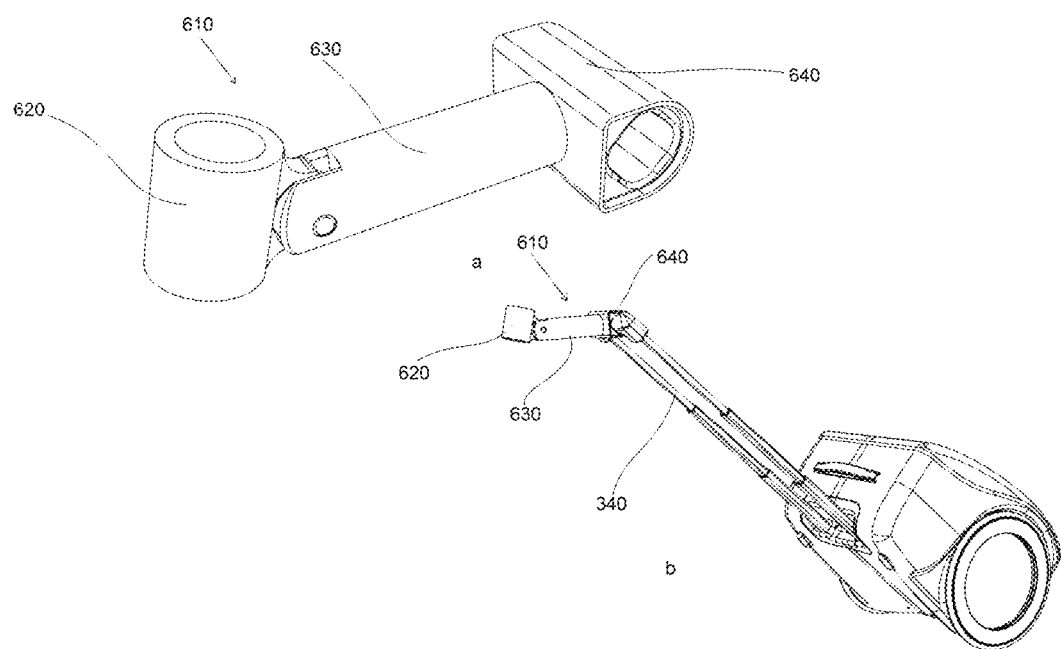

Reference is now made to FIGS. 27 and 28, presenting an embodiment of the present invention configured for a towing case 510 by means of a bicycle 600. Specifically, the case 510 is mechanically connected to the bicycle 600 by means of an adapter 610 comprising a clamp 620 embracing a seat post 650 of the bicycle 600, a clamp 640 embracing the telescopically protrudable handle 340 and a rigid link 630 interconnecting clamps 620 and 640.

Figure 29:
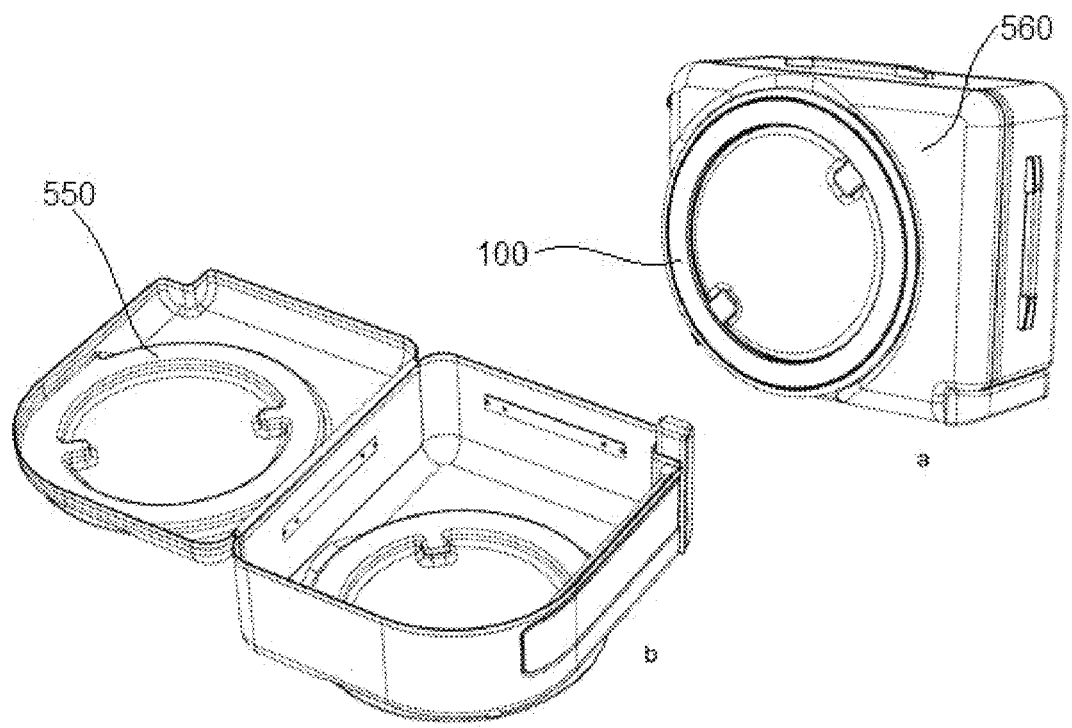
FIG. 29 includes isometric views of a book-like openable case in closed ("a") and open positions ("b")

Reference is now made to FIG. 29 presenting a book-like openable case in close and open positions, respectively. In order to decrease a lateral dimension of the wheeled case of the present invention, the axle-free wheels 100 are mounted within a slot 550 (shown from backside) flush with a side wall 560.

Figure 30:
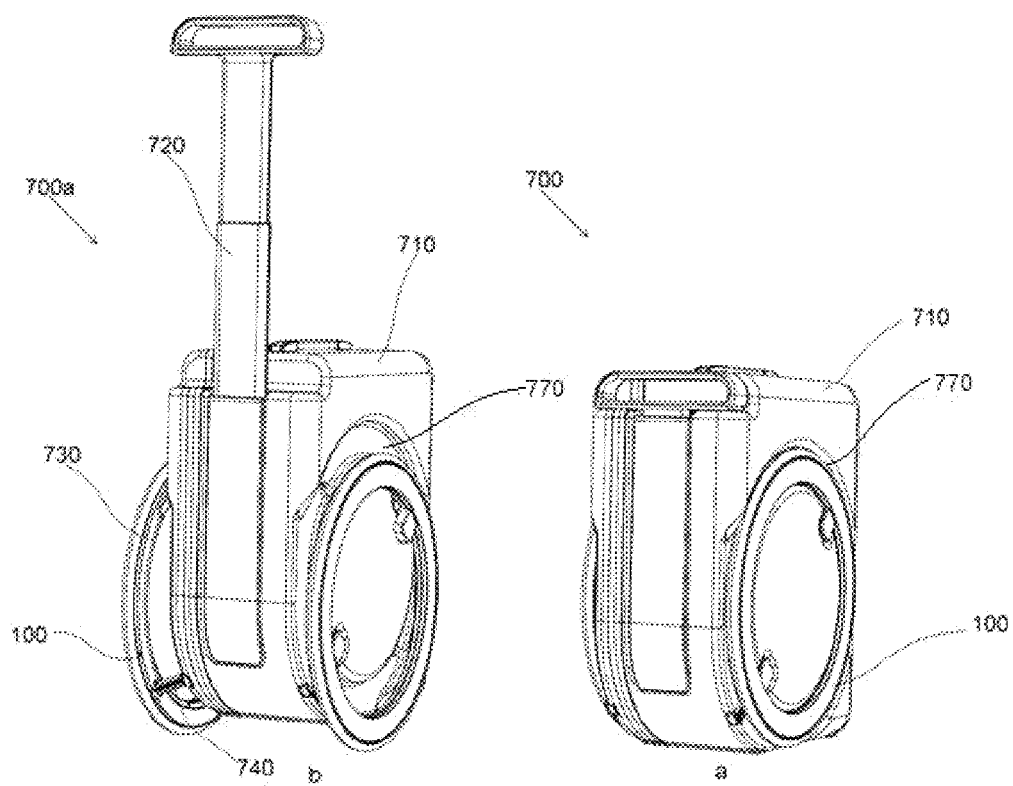
FIG. 30 includes isometric views of a book-like openable case with collapsed ("a") and deployed ("b") axle-free wheels.

Reference is now made to FIG. 30, presenting an embodiment of the present invention provided with a deploying mechanism. According to this embodiment, the deploying mechanism has a collapsed position ("a") and a deployed position ("b"). Specifically, in FIG. 30, the case 700 is characterized by the axle-free wheels 100 sunk within a slots 770 in the case 710 which corresponds to a collapsed position of the deploying mechanism. In the collapsed position, there is no mechanical contact of the axle-free wheels 100 with the ground surface. Contrary to the collapsed position, in a deployed position, the axle-free wheels 100 are protruded from the slots 770 such that the wheels contact with the ground surface.

Figure 31:
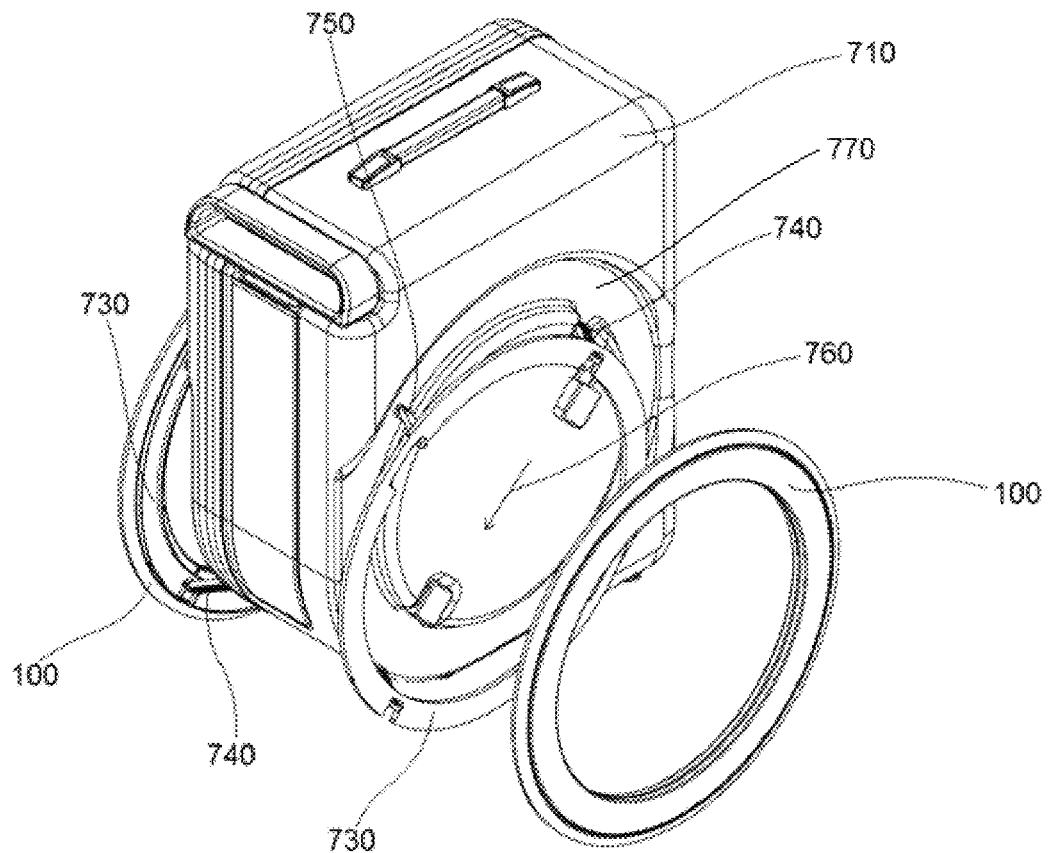
FIG. 31 is an isometric exploded view of a book-like openable case.

Reference is now made to FIG. 31, presenting an exploded view of the wheeled case in a deployed position. The deploying mechanism comprises an annular member 730 configured for mechanically attaching the labyrinth axle-free wheel 100. At least two lever arms 740 hingedly interconnect the member 730 and the slot 770 of the case. Auxiliary arms 750 provide mechanical stability at the deployed position. As seen from FIGS. 29 and 30, the lever arms 740 have a first steady position parallel to the slot 770 of the case 710 (collapsed position) and a second steady position in which the arms 740 are rotated by an obtuse angle (deployed position) relative to the first position. Numeral 760 refers to a direction of deploying the axle-free wheel 100 such that the wheels are able to support the case 710 relative to the ground surface (not shown).

Figure 32:
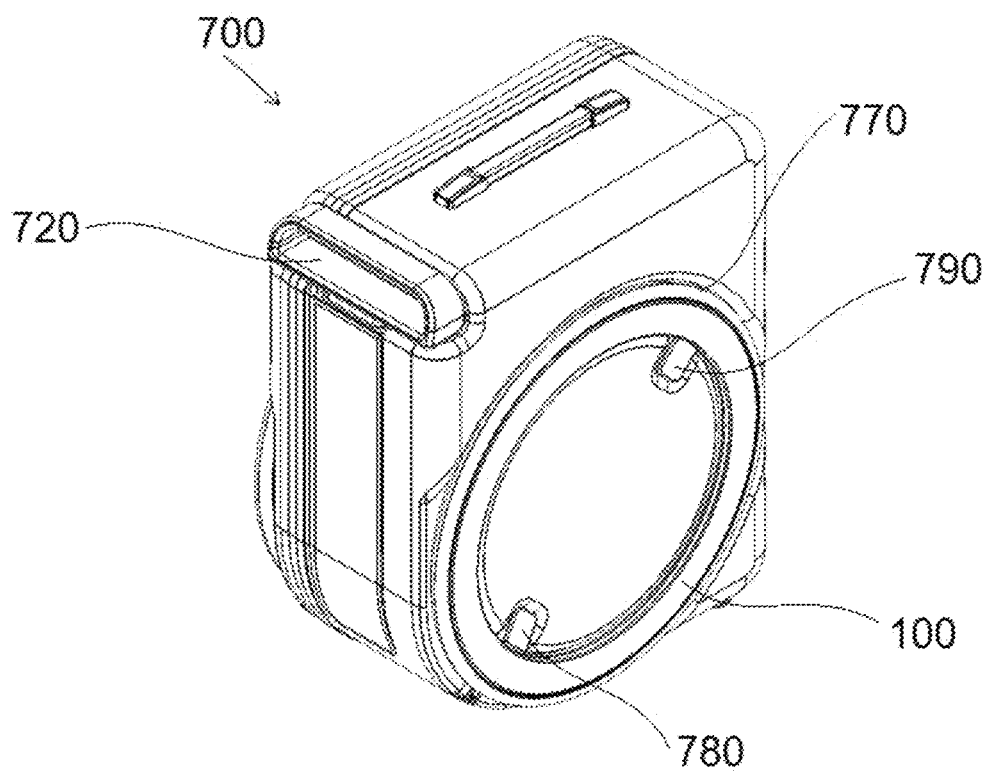
FIG. 32 is an isometric view of a book-like openable case illustrating axle-free wheels deploying.

Reference is now made to FIG. 32, illustrating a procedure of deploying the axle-free wheels 100 from the wheeled case 700. Specifically, a handle 790 is designed for pulling-out the aforesaid wheel 100 from the slot 770 manually. Swinging locking means 780 keeps the wheel 100 in collapsed position (sunk within the slot 770) in a main position in parallel to case wall. The wheel 100 is released when the locking means 780 is manually tilted as shown in FIG. 32. It should be emphasized that the aforesaid swinging locking means are configured for reliably fixating in the abovementioned collapsed and deployed positions. Additionally, fixation of in any intermediate position between the collapsed and deployed positions is in the scope of the present invention.

Summarizing, the abovementioned embodiment of the present invention is characterized by the following technical features:
1. The present embodiment is configured as a book-like openable case.
2. The axle-free wheels in a collapsible position are sunk within the wall slots of the case.
3. The axle-free wheels can be drawn out of the wall slots into a deployed position such that a wheel is enlarged in comparison with a case dimension to prevent the case from rocking or overturning when used.

In accordance with the present invention, a labyrinth axle-free wheel is disclosed. The aforesaid wheel comprises (a) an internal rim; (b) an external rim provided with a ground interface; (c) rollers being rotatably disposed within a roller spacer between the internal and external rims in a uniform circumferential manner by means of a spacer; and (d) external covers.

It is a core feature of the invention to provide a labyrinth dust passage defined by the rims and the external plates mechanically connected to the internal rim.

In accordance with another embodiment of the present invention, at least one of the rims is provided with dust chambers circumferentially distributed over the rim.

In accordance with a further embodiment of the present invention, the rollers are disposed within a roller spacer having two side planar annular members. The members are provided with dust chambers circumferentially distributed thereover.

In accordance with another embodiment of the present invention, the annular members are interconnected by means of pintles circumferentially distributed over the member which carry the rollers.

In accordance with another embodiment of the present invention, at least one roller is provided with at least one a dust-gathering groove.

In accordance with another embodiment of the present invention, the external covers are provided with at least one dust chamber circumferentially distributed over the cover.

In accordance with another embodiment of the present invention, a wheeled luggage case comprises: (a) a storage chamber; (b) a cover defining an opening on at least one side of the storage chamber for providing ready access therein; and at least two labyrinth axle-free wheels operatively connected to the chamber for towing the case along a ground, surface. Flooring, stairs and other types of the surfaces are in the scope of the present invention.

In accordance with another embodiment of the present invention, the case comprises an electric generator kinematically linked to the wheel configured for energizing a load connectable to the generator.

In accordance with another embodiment of the present invention, the case comprises a chargeable internal battery.

In accordance with another embodiment of the present invention, the case comprises an internal compartment configured for accommodating the battery therewith in.

In accordance with another embodiment of the present invention, the case comprises at least one ball bearing configured for supporting and moving the case in an upright position.

In accordance with another embodiment of the present invention, the case comprises an embedded control unit configured for controlling at least one parameter selected from the group consisting of battery charging, internal temperature and cooler operation.

In accordance with another embodiment of the present invention, the case comprises a display configured to display parameters controlled by the controller.

In accordance with another embodiment of the present invention, the case has two covering flaps openable in opposite directions.

In accordance with another embodiment of the present invention, the case is provided with at least one external light configured for illuminating a user's path and enhancing safety thereof.

In accordance with another embodiment of the present invention, the case is provided with at least one internal light configured for illuminating an internal space of the case.

In accordance with another embodiment of the present invention, the chamber is made of a translucent material; the case further comprises internal lighting means configured for change in color of the case.

In accordance with another embodiment of the present invention, the case comprises a telescopically protrudable handle.

In accordance with another embodiment of the present invention, the telescopically protrudable handle is radially configured.

In accordance with another embodiment of the present invention, the control unit comprises a GPS chip, an RFID chip and/or a USB interface and other communication port.

In accordance with another embodiment of the present invention, the case comprises cooling means controlled by the control unit.

In accordance with another embodiment of the present invention, the case comprises expanding means configured for gaining a volume of the case.

In accordance with another embodiment of the present invention, the expanding means is selected from the group consisting of a telescopic member embedded into the frame, a spring-loaded member and any combination thereof.

In accordance with another embodiment of the present invention, the case comprises at least one internal compartment configured for accommodating a specific kind of articles.

In accordance with another embodiment of the present invention, the compartment is marked with a symbol identifying the specific kind of articles.

In accordance with another embodiment of the present invention, the case comprises at least one adjustable connecting means configured for holding user's articles within the compartment. In accordance with another embodiment of the present invention, the case comprises an adapter for towing by means of a bicycle.

In accordance with another embodiment of the present invention, the adapter comprises a clamp embracing a frame of the bicycle, a clamp embracing the telescopically protrudable handle and a rigid link therebetween.

In accordance with another embodiment of the present invention, the two labyrinth axle-free wheels are mounted flush with side wall of the case.

In accordance with another embodiment of the present invention, each of the labyrinth axle-free wheels is provided with a deploying mechanism having a collapsed position and a deployed position.

In accordance with another embodiment of the present invention, the deploying mechanism comprises an annular member configured for attaching the labyrinth axle-free wheel and lever arms hingedly interconnecting the member and the side wall of the case.

In accordance with another embodiment of the present invention, lever arms have a first steady position parallel to the side wall of the case and a second steady position in which the arms are rotated by an obtuse angle with the first position.

What is claimed is:

1. A labyrinth axle-free wheel; said wheel comprising
   a. an internal rim including one or more first dust chambers;
   b. an external rim provided with a ground interface and including one or more second dust chambers;
   c. rollers being rotatably disposed within a roller spacer between said internal and external rims in a uniform circumferential manner by means of a spacer having two side planar annular members provided with one or more third dust chambers;
   d. external covers provided with one or more fourth dust chambers;
   wherein a labyrinth type dust passage is defined by the internal rim, the external rim, the two side planar annular members, and the external covers mechanically connected to said internal rim.

2. The wheel according to claim 1, wherein at least one of said first and second dust chambers is circumferentially distributed over said internal or external rim, respectively.

3. The wheel according to claim 1, wherein the third dust chambers are circumferentially distributed over the roller spacer.

4. The wheel according to claim 3, wherein said annular members are interconnected by means of pintles circumferentially distributed over said members which carry said rollers.

5. The wheel according to claim 1, wherein at least one roller is provided with at least partial circumferential dust-gathering groove.

6. The wheel according to claim 1, wherein said external covers are provided with at least one dust chambers circumferentially distributed over said cover.

7. A wheeled luggage case comprising:
   a. a storage chamber;
   b. a cover defining an opening on at least one side of said storage chamber for providing ready access therein; and
   c. at least two labyrinth axle-free wheels of claim 1 operatively connected to said chamber for towing said case along a ground surface.

8. The case according to claim 7 comprising an electric generator kinematically linked to said wheel configured for energizing a load connectable to said generator.

9. The case according to claim 8 comprising a chargeable internal battery.

10. The case according to claim 9 comprising an internal compartment configured for accommodating said battery therewithin.

11. The case according to claim 7 comprising at least one ball bearing configured for supporting and moving said case in an upright position.

12. The case according to claim 7 comprising an embedded control unit configured for controlling at least one parameter selected from the group consisting of battery charging or internal temperature.

13. The case according to claim 12 comprising a display configured to display parameters controlled by said controller.

14. The case according to claim 12, wherein said control unit comprises a GPS chip.

15. The case according to claim 12, further comprising expanding means configured for gaining a volume of said case.

16. The case according to claim 15, wherein said expanding means is selected from the group consisting of a telescopic member embedded into said frame, a spring-loaded member, a zipper and any combination thereof.

17. The case according to claim 7 provided with at least one external light configured for illuminating a user's path and enhancing safety thereof.

18. The case according to claim 7, wherein said chamber is made of a translucent material; said case further comprises external lighting means configured for change in color of said case.

19. The case according to claim 7 comprising a telescopically protrudable handle.

20. The case according to claim 19, wherein said telescopically protrudable handle is radially configured.

* * * * *